(12) United States Patent
Matsugu

(10) Patent No.: US 7,437,339 B2
(45) Date of Patent: Oct. 14, 2008

(54) PULSE SIGNAL CIRCUIT, PARALLEL PROCESSING CIRCUIT, PATTERN RECOGNITION SYSTEM, AND IMAGE INPUT SYSTEM

(75) Inventor: Masakazu Matsugu, Chiba (JP)

(73) Assignee: Canon Kabuhsiki Kaisha, Tokyo (JP)

( * ) Notice: Subject to any disclaimer, the term of this patent is extended or adjusted under 35 U.S.C. 154(b) by 0 days.

(21) Appl. No.: 11/430,133

(22) Filed: May 9, 2006

(65) Prior Publication Data

US 2007/0011120 A1 Jan. 11, 2007

Related U.S. Application Data

(62) Division of application No. 10/155,478, filed on May 28, 2002, now Pat. No. 7,085,749.

(30) Foreign Application Priority Data

May 31, 2001 (JP) ............................. 2001-164508
May 28, 2002 (JP) ............................. 2002-153997

(51) Int. Cl.
  *G06N 3/00* (2006.01)
  *G06T 1/40* (2006.01)

(52) U.S. Cl. ......................... 706/20; 382/156

(58) Field of Classification Search .................... 706/20
See application file for complete search history.

(56) References Cited

U.S. PATENT DOCUMENTS

| | | | |
|---|---|---|---|
| 5,165,010 A * | 11/1992 | Masuda et al. .............. 706/42 |
| 5,251,269 A | 10/1993 | Korner et al. | |
| 5,519,811 A | 5/1996 | Yoneda et al. | |
| 5,627,943 A | 5/1997 | Yoneda et al. | |
| 5,664,065 A | 9/1997 | Johnson | |
| 5,675,713 A | 10/1997 | Batten, Jr. | |
| 5,764,858 A | 6/1998 | Sheu et al. | |
| 6,016,154 A | 1/2000 | Moroo et al. | |
| 6,088,490 A | 7/2000 | Iwata et al. | |
| 6,618,711 B1 | 9/2003 | Ananth | |

(Continued)

FOREIGN PATENT DOCUMENTS

JP 60-712 1/1985

(Continued)

OTHER PUBLICATIONS

Sirovich et al., Mar. 1987, "Low-Dimensional Procedure for Characterization of Human Faces," J. Opt. Soc. Am. [A], vol. 4, No. 3, pp. 519-524.

(Continued)

*Primary Examiner*—David Vincent
*Assistant Examiner*—Nathan H Brown, Jr.
(74) *Attorney, Agent, or Firm*—Fitzpatrick, Cella, Harper & Scinto

(57) ABSTRACT

A synaptic connection element for connecting neuron elements inputs a plurality of pulsed signals from different neuron elements N1 through N4, effects a common modulation (time window integration or pulse phase/width modulation) on a plurality of predetermined signals among the plurality of pulse signals, and outputs the modulated pulse signals to different signal lines to a neuron element M1. A neural network for representing and processing pattern information by the pulse modulation is thereby downsized in scale.

10 Claims, 17 Drawing Sheets

U.S. PATENT DOCUMENTS

| | | |
|---|---|---|
| 6,654,730 B1 | 11/2003 | Kato et al. |
| 2002/0038294 A1 | 3/2002 | Matsugu |

FOREIGN PATENT DOCUMENTS

| | | |
|---|---|---|
| JP | 5-37317 | 2/1993 |
| JP | 7-262157 | 10/1995 |
| JP | 7-334478 | 12/1995 |
| JP | 8-153148 | 6/1996 |
| JP | 2741793 | 1/1998 |
| JP | 10-327054 | 12/1998 |
| JP | 2879670 | 1/1999 |

OTHER PUBLICATIONS

Lades et al., Mar. 1993, "Distortion Invariant Object Recognition in the Dynamic Link Architecture," IEEE Trans. On Computers, vol. 42, pp. 300-311.

Seibert et al., 1992, "Learning and Recognizing 3D Objects from Multiple Views in a Neural System," in Neural Networks for Perception, vol. 1, Human and Machine Perception, Edited by H. Wechsler, Academic Press, pp. 426-444.

Fukushima et al., 1982, "Neocognitron: A New Algorithm for Pattern Recognition Tolerant of Deformation and Shifts in Position," Pattern Recognition, vol. 15, No. 6, pp. 455-469.

Anderson et al., 1995, "Routing Networks In Visual Cortex," In Handbook of Brain Theory and Neural Networks, MIT Press, pp. 823-826.

Murray et al., Mar. 1991, "Pulse-Stream VLSI Neural Network Mixing Analog and Digital Techniques," IEEE Trans. On Neural Networks, vol. 2, No. 2, pp. 193-204.

Broussard et al., May 1999, "Physiologically Motivated Image Fusion for Object Detection Using a Pulse Coupled Neural Network," IEEE Trans. on Neural Networks, vol. 10, pp. 554-563.

Eckhorn et al., Fall 1990, "Feature Linking via Synchronization Among Distributed Assemblies: Simulations of Results from Cat Visual Cortex," Neural Computation, vol. 2, No. 2, pp. 293-307.

Lazzaro et al., 1993, "Silicon Auditory Processors as Computer Peripherals," in Advances in Neural Infor. Proc. System 5, edited by Hanson et al.

LeCur et al., Jul. 1995, "Convolutional Networks for Images Speech, and Time Series", in Handbook of Brain Theory and Neural Networks, MIT Press, pp. 255-258.

Daugman, Jul. 1988, "Complete Discrete 2-D Gabor Transforms by Neural Networks for Image Analysis and Compression," IEEE Trans. on Acoustics, Speed, and Signal Processing, vol. 36, No. 7, pp. 1169-1179.

Ota et al., May 1999, "Analog Implementation of Pulse-Coupled Neural Networks," IEEE Transactions on Neural Networks, vol. 10, No. 3, pp. 539-544.

Tomberg et al., 1990, "Pulse-Density Modulation Technique in VLSI Implementations of Neural Network Algorithms," IEEE Journal of Solid State Circuits, vol. 25, No. 5, pp. 1277-1286.

* cited by examiner

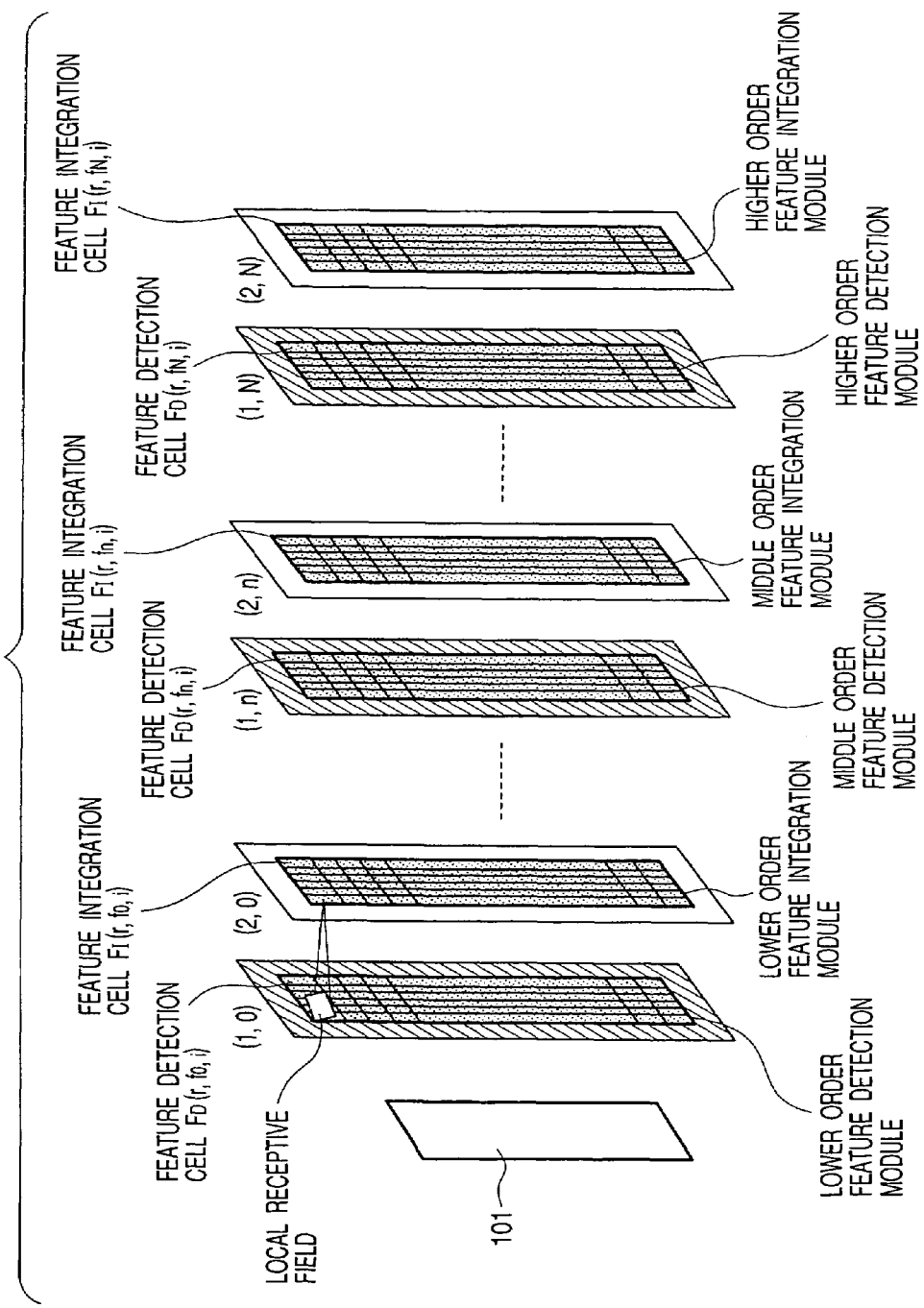

EXAMPLE OF FEATURE
INTEGRATION LAYER
(LOWER ORDER LAYER)
NEURON CONFIGURATION

EXAMPLE OF FEATURE
DETECTION LAYER
(MIDDLE ORDER LAYER)
NEURON CONFIGURATION

EXAMPLE OF FEATURE
DETECTION LAYER
(MIDDLE ORDER LAYER)
NEURON CONFIGURATION

EXAMPLE OF FEATURE
INTEGRATION LAYER
(MIDDLE ORDER LAYER)
NEURON CONFIGURATION

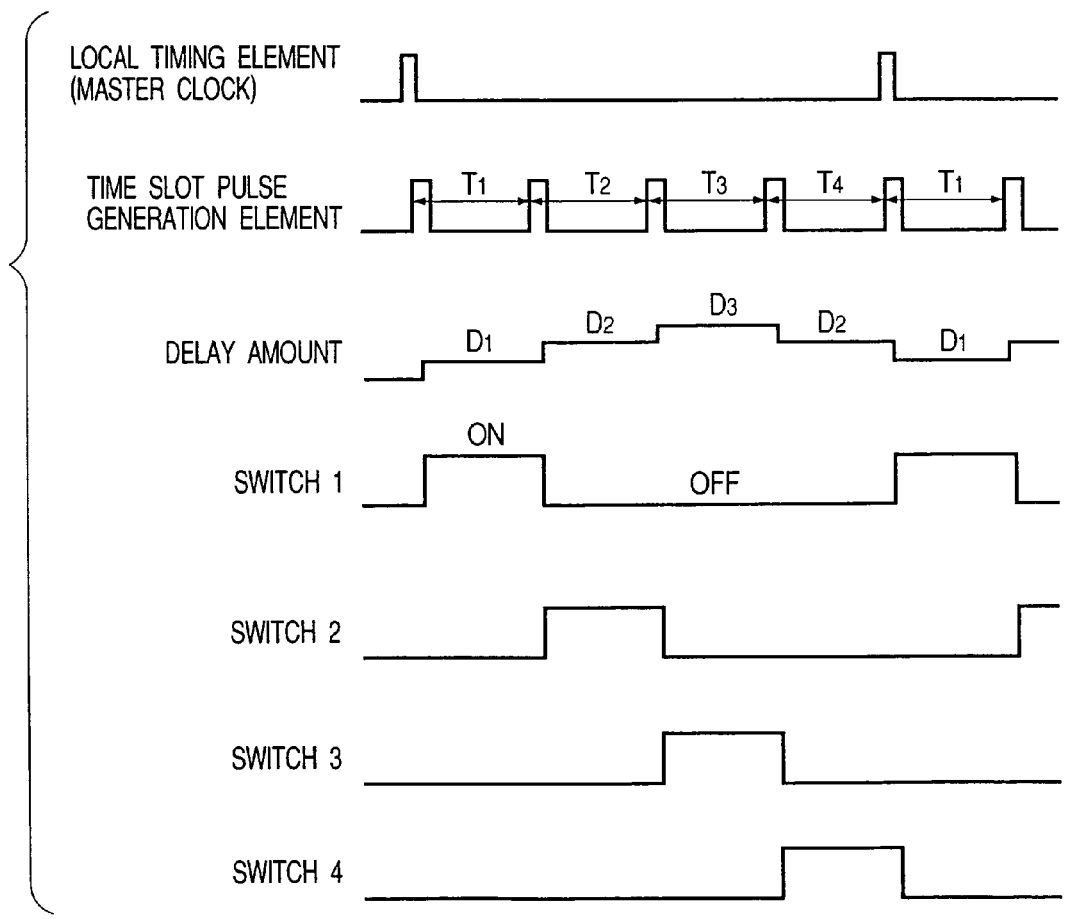

PULSE SIGNAL CIRCUIT, PARALLEL PROCESSING CIRCUIT, PATTERN RECOGNITION SYSTEM, AND IMAGE INPUT SYSTEM

This is a divisional application of application Ser. No. 10/155,478, filed on May 28, 2002 now U.S. Pat. No. 7,085,749.

BACKGROUND OF THE INVENTION

1. Field of the Invention

The present invention relates to a pulse signal circuit and further to a parallel processing circuit and a pattern recognition system that use this pulse signal circuit, and an image input system for detecting a specified object etc. by use of the pattern recognition system.

2. Related Background Art

Image and voice recognition implementation systems have hitherto been roughly classified into such a type that a recognition processing algorithm specialized for a specified recognition object is sequentially operated and executed as computer software, and a type in which the same algorithm is executed by a dedicated parallel image processor (such as an SIMD (Single Instruction Multiple Data) processor, an MIMD (Multiple Instruction stream/Multiple Data stream) processor and so on).

Typical examples are given below as exemplifying the image recognition algorithm. At first, the following is methods involving calculating a feature amount relative to a similarity to a recognition object model. One method is a method for representing recognition object model data as a template model, calculating a similarity by template matching etc with an input image (or a feature vector thereof) and calculating a high-order correlation coefficient. Another method is a method (Sirovich, et al., 1987, Low-dimensional procedure for the characterization of human faces, J. Opt. Soc. Am.[A], vol. 3, pp. 519-524) for mapping an input pattern to an intrinsic image function space obtained by analyzing primary components of an object model image, and calculating an intra-feature-space distance from the model. A further method is a method (Lades et al., 1993, Distortion Invariant Object Recognition in the Dynamic Link Architecture, IEEE Trans. on Computers, vol. 42, pp. 300-311) for representing a plurality of feature extraction results (feature vectors) and a spatial arrangement relationship as graphs, and calculating a similarity based on elastic graph matching. A still further method is a method (Seibert, et al., 1992, Learning and recognizing 3D objects from multiple views in a neural system, in Neural Networks for Perception, vol. 1 Human and Machine Perception (H. Wechsler Ed.) Academic Press, pp. 427-444) for obtaining position-, rotation- and scale-invariable representations by executing predetermined conversions with respect to input images and thereafter collating with a model.

The following is exemplifications of a pattern recognition method based on a neural network model of which a hint is acquired from a biological information processing system. One exemplification is a method (Japanese Patent Post-Exam. No. 60-712, Fukushima and Miyake, 1982, Neocognitron: A new algorithm for pattern recognition tolerant of deformation and shifts in position, Pattern Recognition, vol. 15, pp-455-469) for implementing hierarchical template matching. Another exemplification is a method (Anderson, et al., 1995, Routing Networks in Visual Cortex, in Handbook of Brain Theory and Neural Networks (M. Arbib, Ed.), MIT Press, pp. 823-826) for obtaining object-based scale-and position-invariable representations by dynamic routing neural networks. Other exemplifications are methods using multi-layer perceptrons, a radial basis function network and so on.

On the other hand, what is proposed as a scheme for taking an information processing system based on biological neural networks with a higher fidelity, is a neural network model circuit (Murray et al., 1991, Pulse-Stream VLSI Neural Networks Mixing analog and digital Techniques, IEEE Trans. on Neural Networks, vol. 1.2, pp. 193-204,; Japanese Patent Application Laid-Open Nos. 7-262157, 7-334478 and 8-153148, and Japanese Patent Publication No. 2879670) for transmitting and representing information through on a pulse train corresponding to an action potential.

Methods for recognizing and detecting a specified object by a neural network constructed of pulse train generation neurons, are systems (U.S. Pat. No. 5,664,065, and Broussard, et al., 1999, Physiologically Motivated Image Fusion for Object Detection using a Pulse Coupled Neural Network, IEEE Trans. on Neural Networks, vol. 10, pp. 554-563, and so forth) using a pulse coupled neural network (which will hereinafter be abbreviated to PCNN), to be specific, a high-order (second-order or higher) model by Echhorn (Eckhorn, et al., 1990, Feature linking via synchronization among distributed assembles: simulation of results from cat cortex, Neural Computation, vol. 2, pp. 293-307) which is based on the premise of linking inputs and feeding inputs.

Further, a method for relieving a wiring problem in the neural network is an event-driven oriented method (Address Event Representation: this will hereinafter be abbreviated to AER) (Lazzaro, et al., 1993, silicon Auditory Processors as Computer Peripherals, In Touretzky, D (ed), Advances in Neural Information Processing Systems 5. San Mateo, Calif.: Morgan Kaufmann Publishers) for coding addresses of so-called pulse output neurons. In this case, IDs of pulse train output-sided neurons are coded as binary addresses, whereby even when output signals from the different neurons are arranged in time sequence on a common bus, the input-sided neurons are able to automatically decode the addresses of the source neurons.

On the other hand, the neural network processor related to Japanese Patent Publication No.2741793 schemes to reduce the number of neurons and to downsize a circuit by configuring multi-layered feedforward oriented networks in a systolic array architecture.

Each of the prior arts described above, however, still entails, as problems to a great extent, a difficulty of downsizing both wiring portions related to inter-neuron connections and a circuit scale of synaptic connection circuit of which the number is by far larger than the number of neurons, and a difficulty of applying a layout of respective components to a general pattern recognition.

SUMMARY OF THE INVENTION

It is therefore a primary object of the present invention to actualize an equal performance in a smaller circuit scale than in the prior arts by sharing a synaptic connection circuit.

According to one aspect, the present invention which achieves these objectives relates to a pulse signal processing circuit comprising a modulation circuit for inputting a plurality of pulsed signals from different arithmetic elements and modulating in common a plurality of predetermined signals among the plurality of pulse signals, wherein the modulated pulse signals are outputted in branch to different signal lines, respectively.

According to another aspect, the present invention which achieves these objectives relates to a pattern recognition system comprising a data input unit for inputting data of a predetermined dimension, a plurality of data processing modules having feature detection layers for detecting a plurality of features, and an output unit for outputting a result of a pattern recognition, wherein the data processing module includes a plurality of arithmetic elements connected to each other by a predetermined synaptic connection unit, each of the arithmetic element outputs a pulsed signal at a frequency or timing corresponding to an arrival time pattern of a plurality of pulses within a predetermined time window, the output unit outputs, based on the outputs of the plurality of arithmetic elements, a result of detecting or recognizing a predetermined pattern, and the synaptic connection unit includes a modulation circuit for inputting the plurality of pulsed signals from the different arithmetic elements and effecting a predetermined common modulation on a plurality of predetermined pulsed signals among the plurality of pulsed signals, and outputs in branch the modulated pulse signals to different signal lines.

According to still another aspect, the present invention which achieves these objectives relates to a pulse signal processing circuit comprising a modulation circuit for inputting a plurality of pulsed signals from different arithmetic elements and giving a predetermined delay to each pulse, and a branch circuit for outputting in branch the modulated pulse signals in a predetermined sequence to different signal lines respectively in a way that gives a predetermined delay to the pulse signal.

According to yet another aspect, the present invention which achieves these objectives relates to a parallel processing circuit comprising a plurality of arithmetic elements, arrayed in parallel, for extracting a different feature pattern category in every predetermined area with respect to a predetermined sampling position on input data of a predetermined dimension, wherein each of the arithmetic elements is connected to other predetermined arithmetic element through synaptic connection unit, and the plurality of arithmetic elements for extracting the different feature pattern category relative to the predetermined position on the input data, are disposed adjacent to each other.

According to yet another aspect, the present invention which achieves these objectives relates to a pulse signal processing circuit comprising a parallel modulation circuit for inputting a plurality of pulsed signals from different arithmetic elements and effecting a predetermined modulation in parallel on a plurality of predetermined signals among the plurality of pulse signals, and an integration unit for integrating outputs of the parallel modulation circuit, wherein the parallel modulation circuit includes a plurality of time window integration circuits for effecting a predetermined weighted time window integration with respect to a plurality of predetermined signals among the modulated pulse signals, and the arithmetic element outputs a predetermined pulse signal on the basis of a signal from the integration unit.

According to a further aspect, the present invention which achieves these objectives relates to a pulse signal processing circuit comprising a timing signal generation circuit, a connection unit for connecting the arithmetic elements, wherein the connection unit inputs the pulse signals from the predetermined arithmetic elements and executes a predetermined weighted time window integration, and the arithmetic elements are disposed in parallel by the connection unit and integrate the pulse modulation signals from the connection unit on the basis of a timing signal from the timing signal generation circuit.

Other objectives and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a diagram showing cells on respective layers;

FIG. 14 is a timing chart showing behavioral timings of the respective elements of the synaptic circuit in an embodiment 3;

DESCRIPTION OF THE PREFERRED EMBODIMENTS

First Embodiment

One preferred embodiment of the present invention will hereinafter be described in detail with reference to the accompanying drawings.

Outline of Whole Architecture

Figure 1:
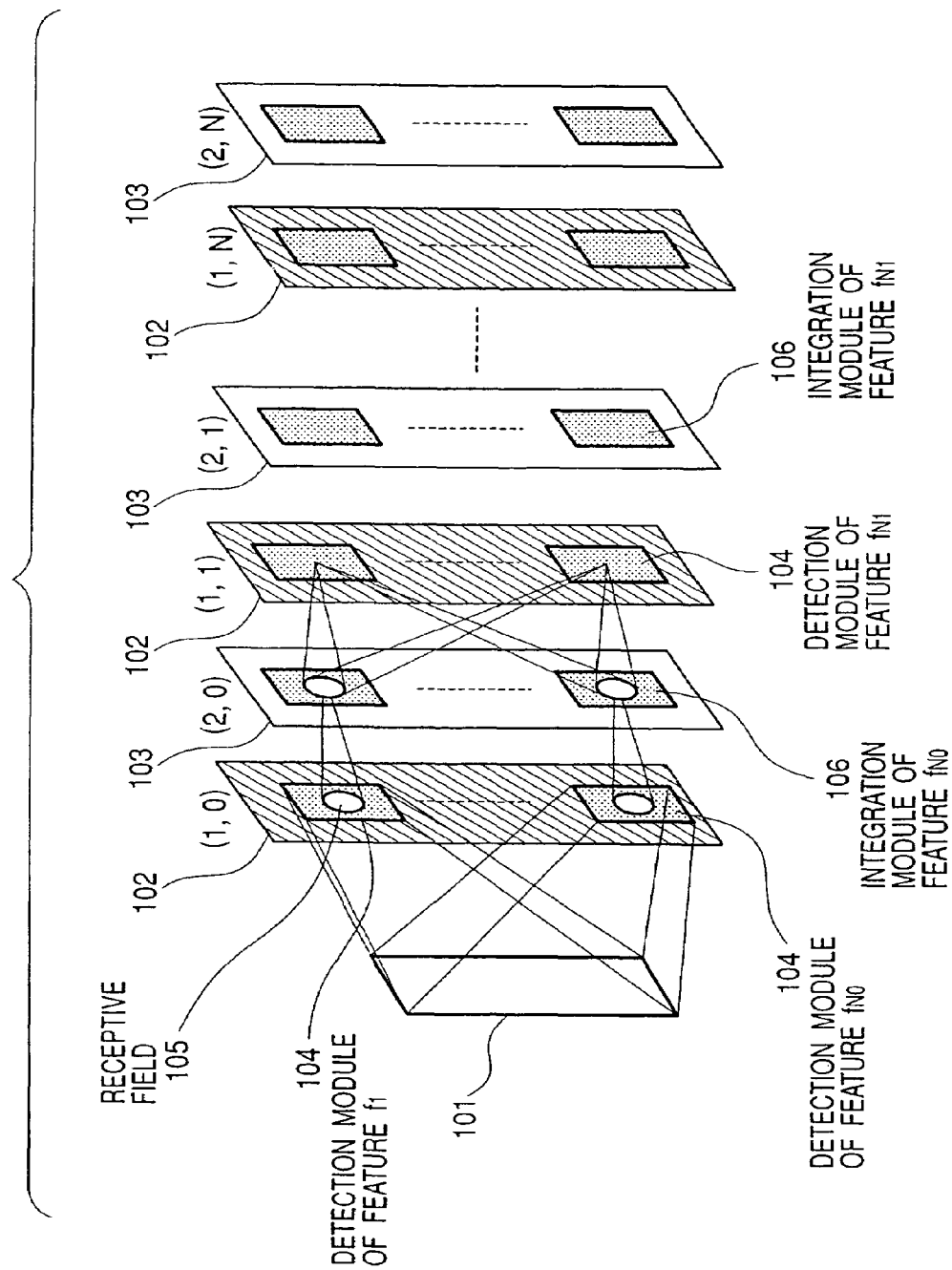
FIG. 1 is a block diagram showing a whole architecture of a network for a pattern detection/recognition system in one embodiment of the present invention.

FIG. 1 is a diagram showing a whole architecture of a network for a pattern detection/recognition system in the first embodiment. This pattern detection/recognition system mainly deals with information related to a recognition (detection) of an object or a geometrical feature.

FIG. 1 illustrates a so-called convolutional network architecture (LeCun, Y. and Bengio, Y., 1995, "Convolutional Networks for Images Speed, and Time Series" in Handbook of Brain Theory and Neural Networks (M. Arbib, Ed.), MIT Press, pp. 255-258). A different point from the prior arts is, however, that inter-layer connections within the same route can take a form of local interconnections (which will hereinafter be described). A final output is defined as a result of the recognition, i.e., a category of the object recognized.

A data input layer 101 is a CMOS (Complementary Metal-Oxide Semiconductor) sensor or a photoelectric converting device such as a CCD (Charge Coupled Device) in the case of detecting and recognizing an image, and a voice input sensor in the case of detecting and recognizing a voice. Further, the data input layer 1 may be structured to input high-order data obtained from a result of analysis (for example, a primary component analysis and so on) by a predetermined data analyzing portion.

Given hereinafter is an explanation of the case of inputting the image. A feature detection layer (1, 0) detects, based on a multiple resolution process such as Gabor wavelet conversion and others, a local low-order feature (that may contain a color component feature in addition to the geometrical feature) of an image patter by the number of a plurality of feature categories at a plurality of scale levels or with a plurality of resolutions at the same area in each of positions over the entire image surface (or at each of predetermined sampling points over the entire image surface). The feature detection layer (1, 0) is constructed of neuron elements, each having a receptive field structure corresponding to a category of feature amount (which is, e.g., gradients of line segments defined as a geometrical structure in the case of extracting the line segments in a predetermined direction as a geometrical feature), and generating a pulse train corresponding to a degree thereof.

A feature detection layer (1, k) configures processing channels with the plurality of resolutions (or at the plurality of scale levels) on the whole (wherein k≧0), Namely, when exemplifying a case where the Gabor wavelet conversion is executed on the feature detection layer (1, 0), a set of feature detection cells with Gabor filter kernels having the same scale level but different directional selectivities as a receptive field structure, configure the same processing channel on the feature detection layer (1, 0), and, on a subsequent layer (1, 1) also, the feature detection cells (for detecting a higher-order feature) receiving outputs from the former feature detection cells, belong to the same channel as the above processing channel. On a still subsequent layer (1, k) (wherein k>1) also, the feature detection cells receiving the outputs from the plurality of feature integration cells configuring the same channel similarly on a (2, k−1) layer, are structured to belong to this channel. The processing at the same scale level (or with the same resolution) proceeds through each processing channel, wherein the low-order through high-order features are detected and recognized by hierarchical parallel processing.

A feature integration layer (2, 0) has a predetermined receptive field structure (a receptive field 105 hereinafter implies a connecting range with an output element of an immediate anterior layer, and the receptive field structure implies a connecting weight distribution), and is constructed of neuron elements each generating the pulse train. The feature integration layer (2, 0) integrates a plurality of neuron element outputs within the same receptive field from the feature detection layer (1, 0) (the integration involving an operation such as sub-sampling based on local averaging, a maximum output extraction and so on). Further, each receptive field of the neuron within the feature integration layer has a structure common to the neurons within the same layer. Each of the feature detection layers 102 (1, 1), (1, 2), . . . , (1, N) and the feature integration layers 103 ((2, 1), (2, 2), . . . , (2 , N)) has a predetermined receptive field structure. The former group of feature detection layers ((1, 1), . . . ) detect, as by the respective layers described above, a plurality of different features in respective feature detection modules. The latter group of feature integration layers ((2, 1), . . . ) integrate results of detecting the plurality of features from the anterior feature detection layers. The former group of feature detection layers are, however, connected (wired) to receive cell element outputs of the anterior feature integration layers belonging to the same channel. The sub-sampling defined as a process executed by the feature integration layer involves averaging the outputs from local areas (local receptive fields of the concerned feature integration layer neurons) from a feature detection cell group coming under the same feature category.

Figure 2A:
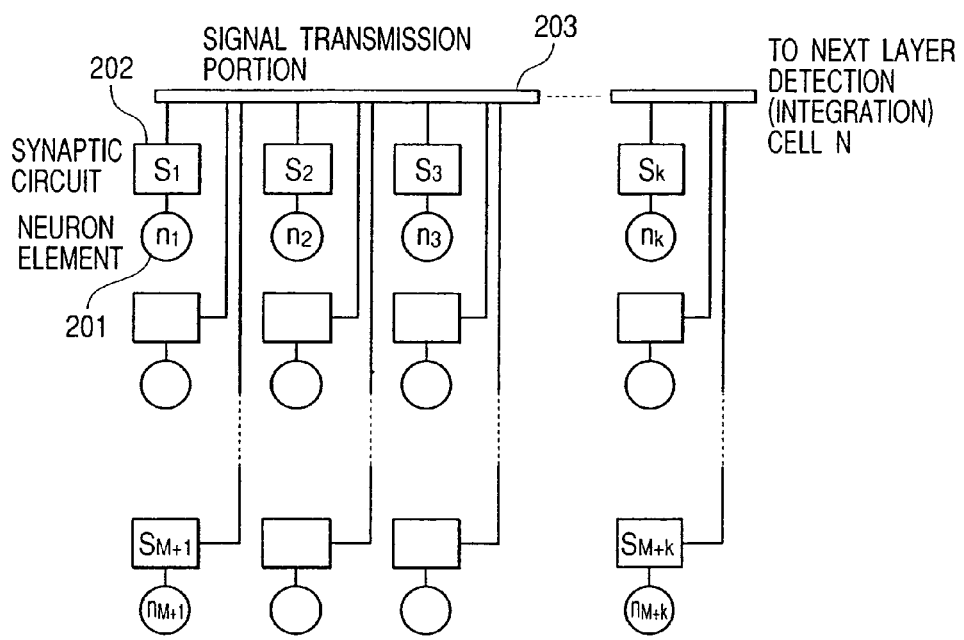
FIGS. 2A, 2B and 2C are diagrams showing configurations of a synaptic portion and a neuron element portion.
Figure 2B:
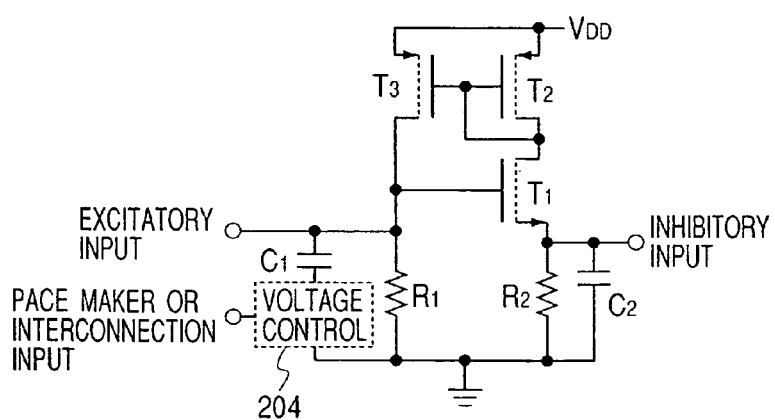
Figure 2C:
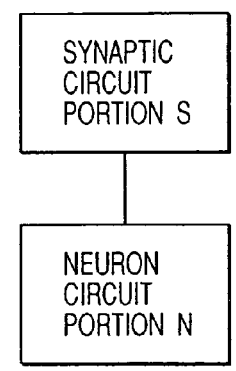

FIGS. 2A, 2B and 2C are diagrams showing a configuration of a synaptic circuit and a configuration of the neuron element. A structure for connecting inter-layer neuron elements 201 is, as depicted in FIG. 2A, built by a signal transmission portion 203 (a wire or a delay line) corresponding to an axon of a neural cell and by synaptic circuits S202 corresponding to dendrites thereof. FIG. 2A shows the connecting architecture related to the outputs (that are inputs if viewed from a certain feature detection (integration) cell (N) from a neuron group ($n_i$) of a feature integration (detection) cell that configures the receptive field with respect to the feature detection (integration) cell (N). The signal transmission portion 203 drawn by a bold line serves as a common bus line, and pulse signals from the plurality of neurons, which are arranged in time-series, are transmitted through on this signal transmission line. The same architecture is also adopted in the case of receiving the inputs from the cell (N) as an output destination. In this case, the input signals and the output signals may be processed in separation on the time-base absolutely in the same architecture, or the processing may be executed in a way that gives the same architecture as FIG. 2A shows in two systems for inputting (the dendrite-side) and for outputting (the axon-side).

The synaptic circuits S202 are categorized into those related to the inter-layer connections (which are the connection between the neurons on the feature detection layer 102 and the connection between the neurons on the feature integration layer 103, and there might exist the on-layer neuron connections to a posterior layer and to an anterior layer), and those related to the connections between the neurons within on the same layer. The latter type of synaptic circuits are used, as the necessity may rise, mainly for connections with pacemaker neurons that will be explained later on and with the feature detection or integration neurons.

In the synaptic circuit S202, a so-called excitatory connection involves amplifying the pulse signals, while an inhibitory connection involves attenuating the signals. In the case of transmitting the information through on the pulse signals, the amplification and the attenuation can be actualized by any one of an amplitude modulation, a pulse width modulation, a phase modulation and a frequency modulation of the pulse signal.

According to the first embodiment, the synaptic circuit S202 is used chiefly for a pulse phase modulation element, wherein the signal amplification is converted into a substantial advance of a pulse arrival time as a quantity intrinsic to a feature, whereas the attenuation is converted into a substantial delay. Namely, the synaptic connection, as will be mentioned later on, gives an arrival position (phase) on the time-base that is intrinsic to the feature in the neurons at the output destination, wherein the excitatory connection gives a phase advance of the arrival pulse with respect to a certain reference phase in terms of a qualitative aspect, and the inhibitory connection gives a delay likewise.

Referring to FIG. 2A, each of neuron elements $n_j$ outputs the pulse signals (a spiked signal train), and involves the use of a so-called integrate-and-fire type neuron element as will be explained below. Note that the synaptic circuit and the neuron elements may, as illustrated in FIG. 2C, be combined to configure a circuit block.

Neuron Element

Next, the neurons that form each layer will be described. Each of the neuron elements is extension-modeled based on the so-called integrate-and-fire type neuron, and is the same as this integrate-and-fire type neuron in terms of such a point that the neuron element fires when a result of linearly adding the input signals (a pulse train corresponding to an action potential) spatiotemporally exceeds a threshold value, and outputs the pulse signals.

FIG. 2B shows one example of a basic architecture representing a behavior principle of the pulse generation circuit (CMOS circuit) defined as the neuron element, and illustrates what a known circuit (IEEE Trans. On Neural Networks Vol. 10, p. 540) is extended. Herein, the pulse generation circuit is constructed as what receives the excitatory input and the inhibitory input.

The behavior principle of this pulse generation circuit will hereinafter be explained. A time constant of a capacitor $C_1$/resistor $R_1$ circuit on the side of the excitatory input, is smaller than a time constant of a capacitor $C_2$/resistor $R_2$ circuit on the side of the inhibitory input. In a steady state, transistors $T_1$, $T_2$, $T_3$ are cut off. Note that the resistor is actually constructed of a transistor connected in a diode mode.

When an electric potential of the capacitor $C_1$ increases and gets higher by a threshold value of the transistor $T_1$ than that of the capacitor $C_2$, the transistor $T_1$ becomes active, and further the transistors $T_2$, $T_3$ get active. The transistors $T_2$, $T_3$ form a current mirror circuit, and an output of the circuit shown in FIG. 2B is given forth from the side of the capacitor $C_1$ by an unillustrated output circuit. The circuit is structured so that when an electric charge accumulation amount of the capacitor $C_2$ is maximized, the transistors $T_1$ falls into a shutdown, then the transistors $T_2$, $T_3$ are cut off as a result of the above shutdown, and a positive feedback comes to 0.

During a so-called refractory period, the capacitor $C_2$ discharges, and, if a potential of the capacitor $C_1$ is larger than a potential of the capacitor $C_2$ and unless a difference therebetween is over the threshold value of the transistor $T_1$, the neuron does not respond. The periodic pulses are outputted with a repetition of alternate charging/discharging of the capacitors $C_1$, $C_2$, and a frequency thereof is generally determined corresponding to a level of the excitatory input. Owing to an existence of the refractory period, the frequency can be, however, restricted to the maximum value, and a fixed frequency can also be outputted.

The potential, i.e., the charge accumulation amount of the capacitor is controlled in terms of the time by a reference voltage control circuit (time window weighting function generation circuit) 204. What reflects this control characteristic is a weighted addition within a time window with respect to the input pulse, which will be mentioned later on (see FIGS. 7A, 7B, 7C, 7D and 7E). This reference voltage control circuit 204 generates a reference voltage signal (corresponding to a weighting function in FIG. 7B) on the basis of an input timing (or an interconnection input to the neuron of the subsequent layer) from a pacemaker neuron that will hereinafter be described.

The inhibitory input is not necessarily required in the first embodiment in some cases, however, the input to the feature detection layer neuron from the pacemaker neuron is set inhibitory, whereby a divergence (saturation) of the output can be prevented.

Generally, a relationship between the summation of the input signals and the output level (the pulse phase, the pulse frequency, the pulse width and so forth) changes depending on a sensitivity characteristic of the neuron. This sensitivity characteristic can be changed depending on a top-down input from a higher-order layer. In the following discussion, it is assumed for an explanatory convenience that circuit parameters be set so that a pulse output frequency corresponding to the summation value of the input signals rises steeply (therefore, the values are substantially binary in a frequency domain) and that the output level (such as a timing with a phase modulation added) and so on) fluctuates depending on the pulse phase modulation.

Figure 5A:
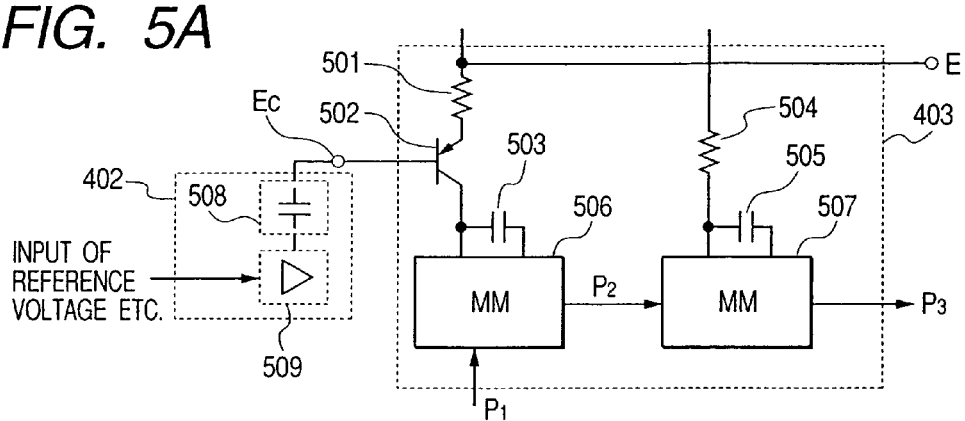
FIGS. 5A, 5B and 5C are diagrams showing an architecture of a synaptic connection small circuit, and an architecture of a pulse phase delay circuit.
Figure 5B:
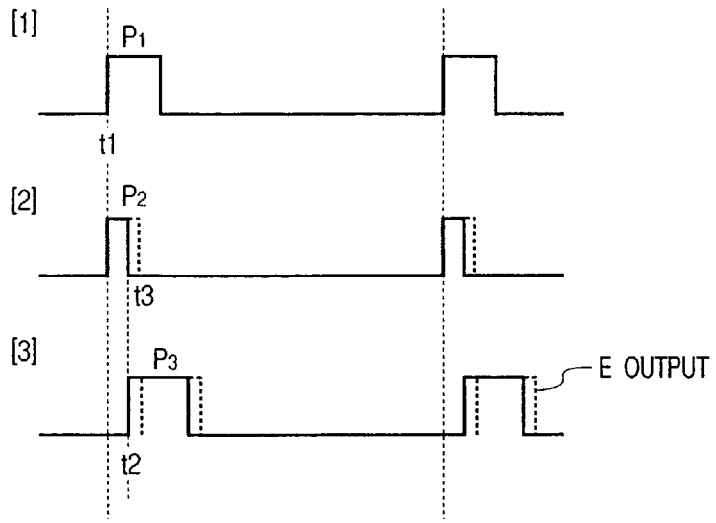
Figure 5C:
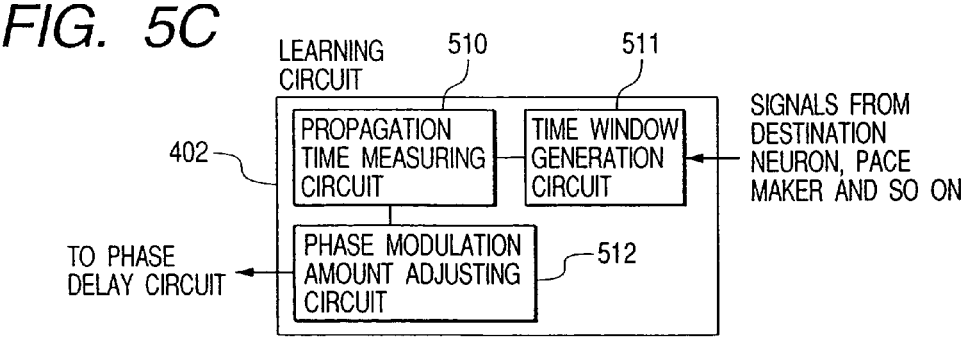

Moreover, a pulse phase modulation portion may have an addition of a circuit as shown in FIGS. 5A, 5B and 5C, which will hereinafter be described. With this scheme, the weighting function in the time window is controlled based on the reference voltage with the result that the phase of the pulse output from this neuron changes, and this phase can be used as an output level of the neuron.

Figure 7A:
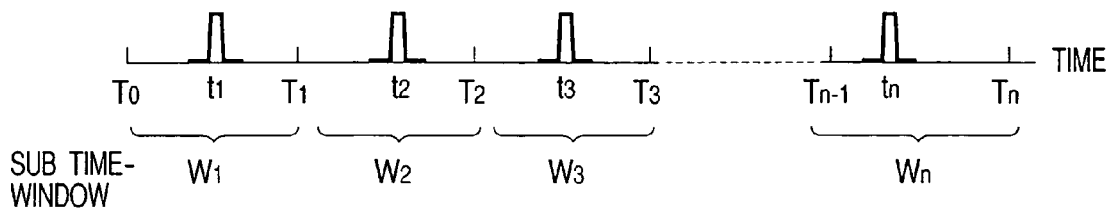
FIGS. 7A, 7B, 7C, 7D and 7E are graphs showing a structure of a time window, an example of a weighting function distribution and an example of feature elements when processing a plurality of pulses corresponding to the different feature elements, which are inputted to feature detection neurons.
Figure 7B:
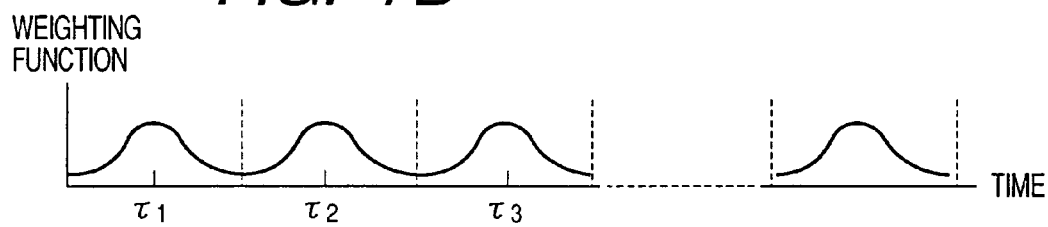

A time $\tau_{w1}$, as shown in FIG. 7B, corresponding to a maximum value of the weighting function that gives a time integrating characteristic (receiving sensitivity characteristic) with respect to the pulse having undergone the pulse phase modulation at the synaptic connection, is generally set earlier in time than an arrival predicted time $\tau_{s1}$ of the pulse intrinsic to the feature given by the synaptic connection. As a result, the pulse arriving earlier than the arrival predicted time within a fixed range (the pulse arriving too early is attenuated in the example in FIG. 7B) is, in the neuron receiving this pulse, integrated in time as a pulse signal having a high output level. A profile of the weighting function is not limited to a symmetry as seen on Gaussian function etc and may assume an asymmetry. It should be noted based on the gist elucidated above that the center of each weighting function in FIG. 7B does not correspond to the pulse arrival predicted time.

Further, an output phase of a (presynaptic) neuron has such an output characteristic that a delay (phase from a fiducial time corresponding to the beginning of the time window as will be explained later on, is determined by the charge accumulation amount after detecting phase synchronization when receiving the reference pulse (based on the pacemaker output and others). A detailed architecture of the circuit giving this output characteristic is not essential to the present invention and is therefore omitted herein. A pulse phase of a postsynaptic neuron is what the pulse phase of the presynaptic neuron is added to an intrinsic phase modulation amount given at the synapse concerned.

Further, there may also be utilized such a known circuit architecture as to give forth an oscillatory output delayed by a predetermined timing when the input summation value obtained by use of the window function and so on exceeds the threshold value.

The architecture of the neuron elements using the neurons belonging to the feature detection layer 102 or the feature integration layer 103, may take such a circuit architecture as to output the pulse with a phase delay corresponding to the input level (the simple or weighted summation value of the inputs described above) at which the concerned neuron receives from the receptive field of the anterior layer after receiving the pulse outputted from the pacemaker neuron in a case where a firing pattern is controlled based on an output timing of the pacemaker neuron that will be mentioned later on. In this case, before the pulse signal from the pacemaker neuron is inputted, there exists a transient state where the respective neurons output the pulses in random phases with respect to each other in accordance with the input levels.

The neuron of the feature detection layer 102 has, as explained above, the receptive field structure corresponding to the feature category, and outputs the pulse with an output level (given herein in the form of the phase change; it may also be structured to show a change based on the frequency, the amplitude and the pulse width) taking a so-called squashing function value, i.e., such a non-reductive and nonlinear function as to gradually saturate with a fixed level, as in the case of, e.g., a sigmoidal function, etc., in accordance with a weight summation value (that will be explained below) when this weight summation value depending on the time window function of the input pulse signal from the neuron of the anterior layer (the input layer 101 or the feature integration layer 103) is equal to or larger than the threshold value.

Synaptic Circuit and Others

Figure 4A:
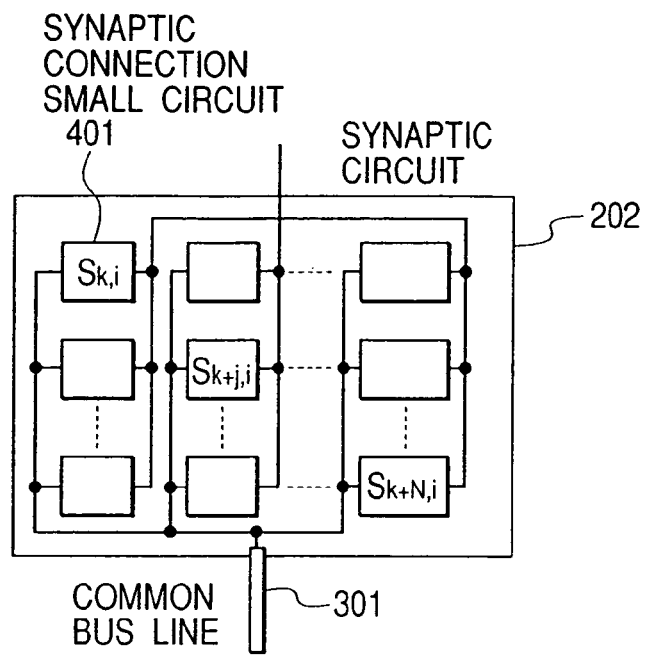
FIGS. 4A, 4B and 4C are diagrams showing an architecture of a synaptic circuit.
Figure 4B:
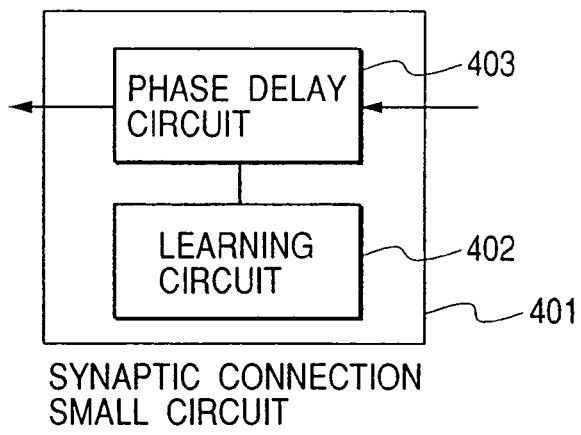
Figure 4C:
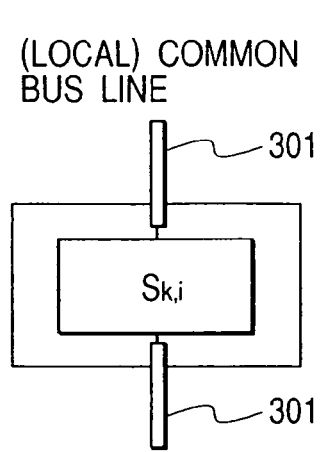

FIGS. 4A, 4B and 4C show a matrix layout of synaptic connection small circuits each giving a synaptic connection strength (that implies a magnitude of the modulation in regard to the phase delay etc) to each of neurons $n'_j$ to which the neurons $n_i$ are connected in the synaptic circuit 202 ($S_i$).

As described above, each neuron of the feature detection layer 102 has the local receptive field structure (which is the local synaptic connection structure to the anterior layer) in accordance with the a structure of the pattern to be detected. This local receptive field structure contains a plurality of synapses that give a symmetry or a common connection strength. With respect to the symmetry of the connection structure, excluding the symmetry of a connection strength distribution pattern as viewed from the neuron on the input side (a receiving side) of the signal, there exists a symmetry (or a plurality of connection strengths taking the same value) of a connection strength distribution pattern as viewed from the neuron on the output side (a transmitting side).

The former is typically a case where the feature detection layer neuron for detecting a certain feature category inputs, partially or totally with the same connection strength, pulse outputs (strength levels) from the feature integration layer neurons (corresponding to input layer pixels) with respect to a plurality of different low-order feature categories (or input pixel portions). For instance, each of the receptive field structures of the feature detection layer neurons for performing the Gabor wavelet conversion assumes the symmetry and has the same sensitivity level (connection strength) in a plurality of positions of the receptive fields.

The latter is a case where, for example, a plurality of pulse signals having undergone an intrinsic modulation in the synaptic connection element, are outputted to the plurality of neurons, detecting the different feature categories, of the feature detection layer defined as a subsequent layer from the feature integration layer neuron representing a certain category, and a synaptic connection pattern assumes a distribution symmetry (or this connection pattern gives the same modulation amount in the plurality of synaptic connections).

On the other hand, the connection to the neuron of the middle- or high-order feature detection layer 102 from the low- or middle-order feature integration layer 103 in the former structure, generally can also take a non-local receptive field structure (connection pattern) (see FIG. 1). If laid out as shown in FIG. 8 and FIGS. 9A and 9B, however, the local structure is obtained, and the same symmetry (or the plurality of connection distribution distributions at the same level within the same receptive field) with respect to the local receptive field structure can be given.

Namely, the non-local receptive field structure described above, in the structure depicted in FIG. 1, the feature integration layer neurons of a plurality of feature integration modules (indicated by small rectangular areas on, e.g., a (2, 0) layer in FIG. 1) belonging to feature categories different from each other, are arranged, even when related to a feature concerning the same position on the input data, in positions that are spatially far distant from each other if the feature integration module to which these neurons belong differs, which means that the connection to the feature detection layer from the feature integration layer takes such a non-local wiring structure that the positional proximity (or the coincidence) on the input data is not necessarily the proximity in terms of wiring because of those outputs from the plurality of feature integration layer neurons being inputted to the feature detection layer neuron.

A structure shown in FIG. 8 and FIGS. 9A and 9B will hereinafter be explained. The feature integration layer neurons with respect to the plurality of geometrical features in a predetermined position (or in local areas with this position being centered) on the input data, are disposed adjacent to each other, and the respective neurons have connections to the higher-order feature detection later neurons. Referring to FIG. 8, a feature detection cell $F_D$ (r, $f_k$, i) is defined as a cell for detecting an i-th feature category on a feature detection layer k in a position corresponding to a location r on the input data. Further, a feature integration cell $F_I$ (r, $f_k$, i) is likewise defined as a cell related to an i-th feature category on a feature integration layer k in the position corresponding to the location r on the input data. FIG. 8 schematically shows that each area showing, together with the local receptive field, the inter-layer connection to the feature integration layer from the feature detection layer with respect to the low-order feature, has the local receptive field structure in each inter-layer connection unlike FIG. 1.

Figure 9A:
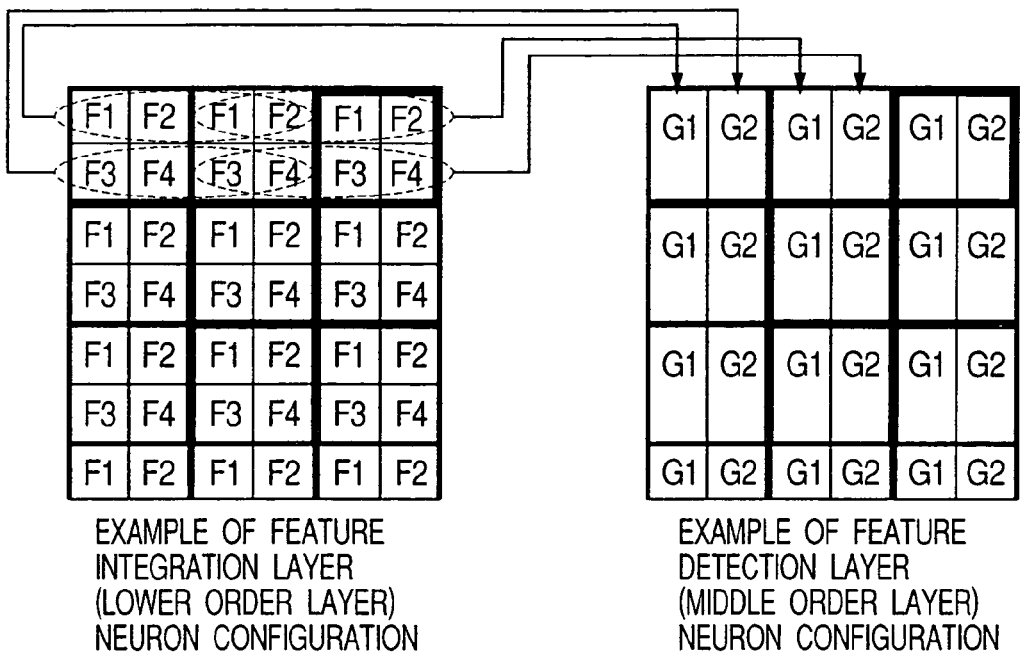
FIGS. 9A and 9B are diagrams each showing an example of a neuron configuration (array)
Figure 9B:
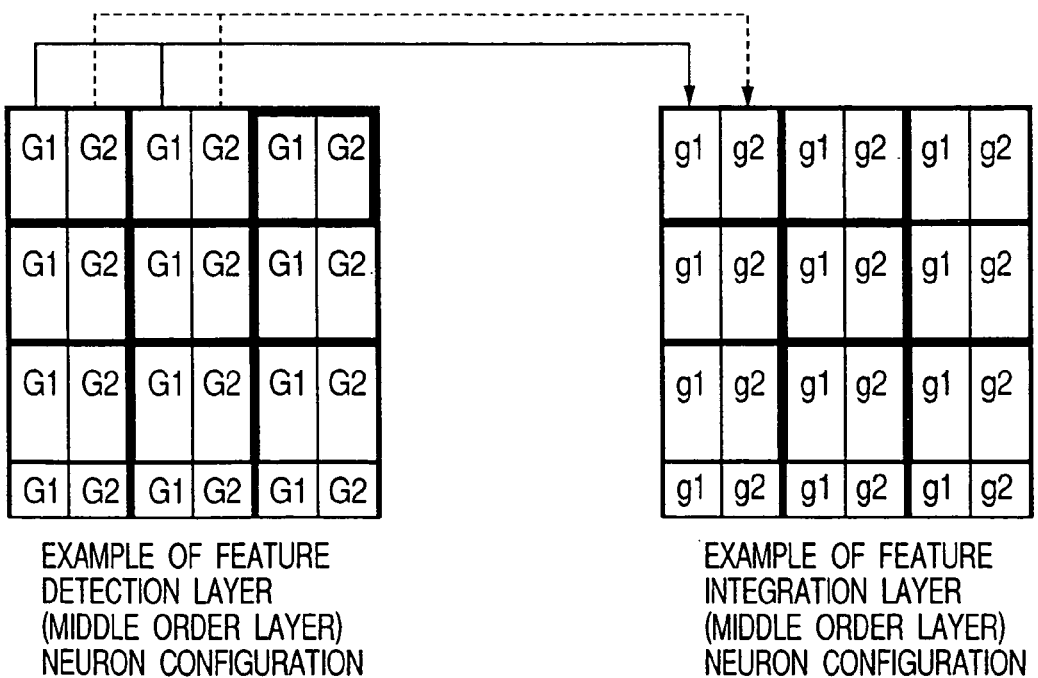

For instance, if the number of the feature categories to be extracted, is 4, the neuron elements corresponding to the respective feature categories (F1, F2, F3, F4) are locally arrayed in cluster as illustrated on the left side in FIG. 9A. Herein, the neuron elements arrayed in cluster represents the feature integration layer neurons with respect to the different geometrical features in the same position on the input data. According to the first embodiment, the feature integration layer involves the use of an array structure as illustrated on the left side in FIG. 9A. Further, FIG. 9A schematically shows wiring from the unspecified neurons of the feature integration layer to a high-order (corresponding to a middle level in the network as a whole) feature detection layer.

On the feature detection layer, high-order feature categories (which are herein two categories G1, G2) are detected in every predetermined position on the input data. The neurons relative to the category G1 receive outputs from the neurons (belonging to elliptical areas defined by dotted lines in FIG. 9A and related to an existence or non-existence of this category in positions corresponding to a plurality of locations in the local area on the input data) relative to F1, F2 of the feature integration layer. Similarly, the neurons relative to the category G2 receive outputs from the neurons related to F3, F4 of the feature integration layer. Referring again to FIGS. 9A and 9B, the adjacent neurons of the feature detection layer receive outputs from the neurons (belonging to overlapped area segments of the ellipses in FIGS. 9A and 9B) existing in overlapped area segments on the feature integration layer.

FIG. 9B further schematically shows a part of the structure of wiring from the feature detection layer to the feature integration layer defined as a high-order layer of this feature detection layer, and also an array of the neuron elements of the feature integration layer corresponding thereto. Herein, feature categories (g1, g2) of the respective neurons of the feature integration layer are mapped to the feature categories (G1, G2), respectively, and geometrical feature represents the same category (the representations are distinguished from each other for the convenience's sake). The respective feature integration layer neurons receive the outputs from the plurality of neurons existing in the local areas on the feature detection layer.

A circuit layout in matrix is that the signal lines of which a synaptic connection strength (phase delay amount) is common are clustered by a single synaptic small circuit with respect to every common synaptic connection strength. To be specific, the input signal lines from the plurality of different neurons are connected to a shared synaptic small circuit that should exist on the input side to the unspecified feature detection layer neurons, and further the output signal lines to the plurality of different neurons or the signal lines each to the single neuron are connected thereto as the signal lines to an output destination (the feature integration layer) from the concerned neurons.

Referring to FIGS. 10 and 11, there will be explained a sharing process of the synaptic connection circuit, which is executed in a case where a connection pattern (synaptic modulation distribution) to the respective feature detection layer neurons assumes a symmetry, or a case where a plurality of synaptic connections give the same modulation amount.

In common throughout the respective Figures, feature detection layer neurons M1, M2, M3 have connections in sequence through a synaptic circuit (plus switch circuit) group, wherein one connection is formed by a neuron group (N1 through N5) with N3 being centered on the feature integration layer, another connection is formed by a neuron group (N3 through N7) with N5 being centered, and a further connection is formed by a neuron group (N5 through N9) with N7 being centered. The symbols $D_1, D_2, D_3$ shown in the synaptic circuits (plus switch circuits) represent pulse delay quantities at the respective synapses. Given herein by way of a simple example is such a topology that in the connections to the feature detection layer neurons, the output from the central neuron receives the delay amount $D_2$, the outputs from the neurons most vicinal (adjacent on both sides) to the central neuron receive $D_3$, and the output from the neurons positioned at the second distance from the central neuron.

Figure 10A:
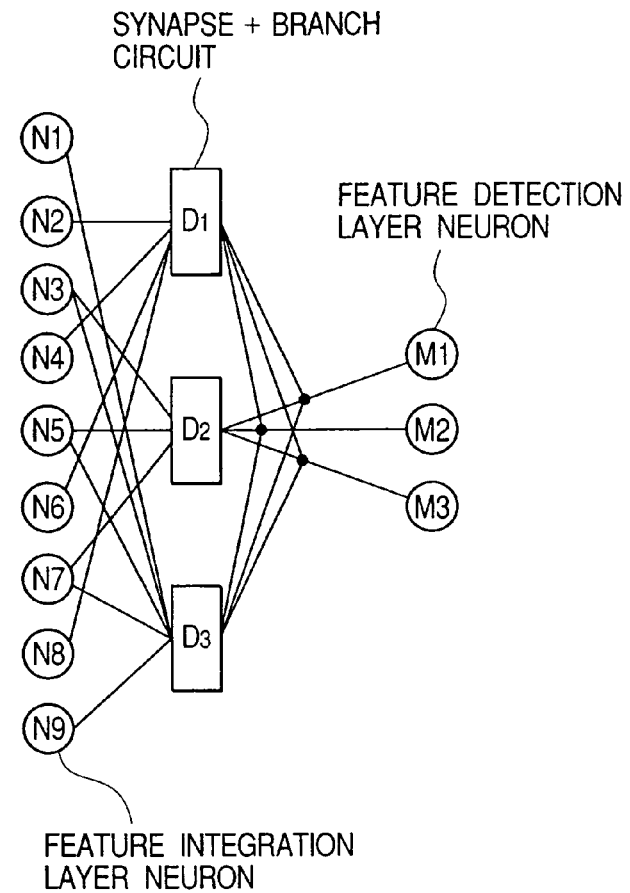
FIGS. 10A and 10B are diagrams showing a sharing structure of a synaptic connection circuit.
Figure 10B:
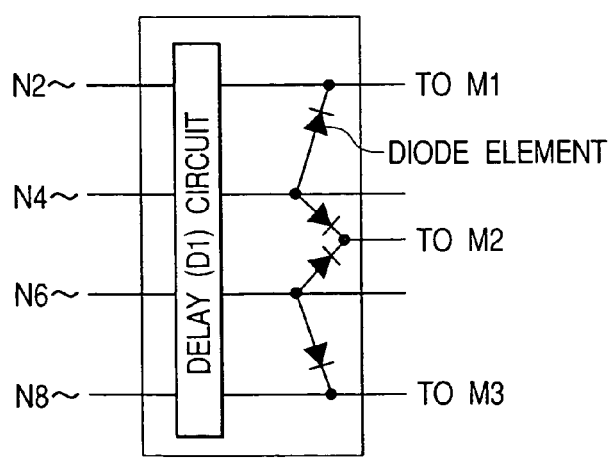

Referring to FIG. 10A, the respective pulse signal outputs from the plurality of neurons are given the fixed delays in the same circuits and then outputted in branch to the different neurons in accordance with the neurons on the input side by use of the synapse plus branch circuits. The branch output implies that the pulses modulated with the predetermined delay quantities are outputted to the plurality of feature detection neurons, and, referring again to FIG. 10A, the branch lines are wired as shown in FIG. 9B within the synaptic circuit for giving the delay amount $D_1$.

For example, the pulse output from the feature integration layer neuron N2 is given the delay amount $D_1$ in the synaptic circuit and thereafter outputted in branch to only the feature detection layer neuron M1. Herein, as shown in FIG. 9B, diodes are set on the branch wires posterior to the delay element, whereby the outputs from the specified neurons are outputted to the specified neurons owing to the branch structure. The output from the neuron N4 is, after being given the delay $D_1$, outputted to the feature detection layer neurons M1, M2. This is because the receptive fields of the neurons M1, M2 are overlapped at N4. Further, the pulse outputs from N5 are a signal outputted to M2 after receiving the delay amount $D_2$ and a signal outputted to Ml after receiving the delay $D_3$. The delays of the outputs from the neurons and the detailed branch output structure are the same as those shown in FIG. 11A.

Figure 11A:
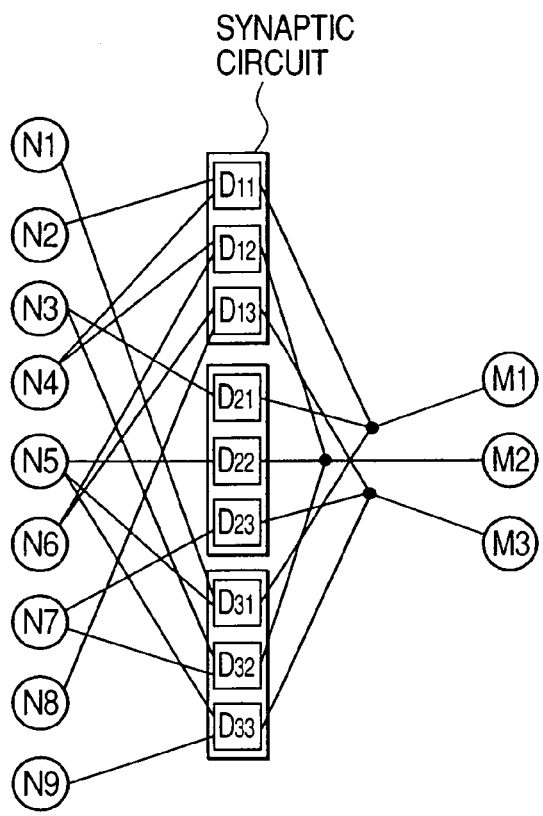
FIGS. 11A and 11B are diagrams showing another sharing structure of the synaptic connection circuit.

FIG. 11A shows that a small circuit $D_{ij}$ in each synaptic circuit gives a delay amount $D_i$ to the pulse and outputs it to the neuron Mj. Further, the inputs to the respective synaptic circuits giving the delay amount $D_i$ require a larger amount of wires for connecting the small circuits different depending on the branch output destinations than in FIGS. 10A and 10B.

As the input signal lines to the unspecified feature integration layer neurons, in the case of implementing the local averaging of uniform weighting for sub-sampling with respect to these neurons, as will be explained later on, the synaptic circuit for giving the predetermined pulse delays etc are not required to be provided midway. In the case of executing a process such as non-uniform local averaging etc, however, there may be taken the same architecture of the synaptic connection circuit to the feature detection layer neuron.

Each of those output signal lines may be connected to a predetermined synaptic circuit or may also be connected as a simple branch line (delay line or wire) to an output destination neuron. Note that the signal, it is assumed, be a pulse signal inputted and outputted in a voltage mode.

Figure 3A:
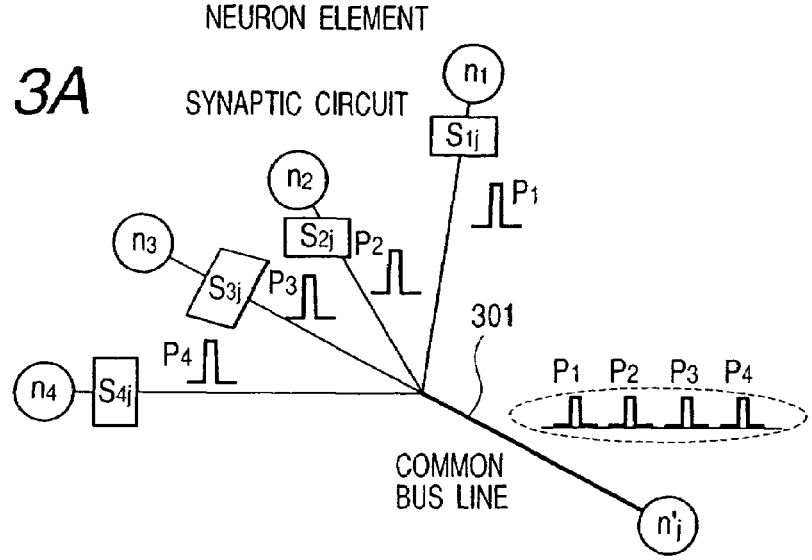
FIGS. 3A and 3B are diagrams showing how a plurality of pulses are propagated to feature detection layer neurons from a feature integration layer or an input layer.

If the network takes such an architecture as to have a shared connection mode (for representing the synaptic connection structures of the plurality of neurons with the weighting coefficient distribution given in 1) of the connection weights, the delay amount ($P_{ij}$ given in the following formula (1)) at each synapse can be made uniform within the same receptive field in some cases unlike the case in FIGS. 3A and 3B. For example, the connection to the feature integration layer from the feature detection layer, if the feature integration layer performs sub-sampling based on the local averaging (which is to be, however, the uniform weighting) of the outputs of the feature detection layer defined as an anterior layer thereto, may take the above architecture without depending on the detection object (i.e., without depending on a category of the object).

In this case, as illustrated in FIG. 4C, a single circuit $S_{k,i}$ suffices for forming each of the synaptic connection small circuits 401 in FIG. 4A, and this circuit architecture is particularly economical. On the other hand, if the connection to the feature detection layer from the feature integration layer (or a sensor input layer) takes this circuit architecture, what the feature detection neuron detects is such an event that the pulses representing a plurality of different feature elements arrive simultaneously (or arrive substantially at the same time).

As depicted in FIG. 4B, each of the synaptic connection small circuits 401 is constructed of a learning circuit 402 and a phase delay circuit 403. The learning circuit 402 adjusts the above delay amount by changing a characteristic of the phase delay circuit 403. Further, the learning circuit 402 stores a characteristic value thereof (or a control value thereof) on a floating gate element or on a capacitor connected to the floating gate element. The phase delay circuit 403 is classified as a pulse phase modulation circuit and is, as shown in FIG. 5A, configured by using, for instance, monostable multivibrators 506, 507, resistors 501, 504, capacitors 503, 505 and a transistor 502. FIG. 5B shows respective timings of a rectangular wave P1 ([1] in FIG. 5B) inputted to the monostable multivibrator 506, a rectangular wave P2 ([2] in FIG. 5B) outputted from the monostable multivibrator 506, and a rectangular wave P3 ([3] in FIG. 5B) outputted from the monostable multivibrator 507.

Though a detailed explanation of an operational mechanism of the phase delay circuit 403 is omitted, a pulse width of the rectangular wave P1 is determined by a time till a voltage of the capacitor 503 based on a charging current reaches a predetermined threshold value, while a pulse width of the rectangular wave P2 is determined by a time constant of the resistor 504 and the capacitor 505. If the pulse width of P2 expands (as indicated by a dotted-line rectangular wave in FIG. 5B) and if a fall timing thereof is shifted back, a rise time of P3 is shifted by the same quantity, however, the pulse width of P3 remains unchanged, and it therefore follows that the rectangular wave is outputted in a way of being modulated by a phase of the input pulse.

A control voltage Ec is changed by the learning circuit 402 for controlling the charge accumulation amount to a refresh circuit 509 having the reference voltage and to the capacitor 508 for giving the connection weight, whereby the pulse phase (delay amount) can be controlled. A long-term retainment of this connection weight may involve storing the connection weight as charge of the floating gate element (not shown) provided outside the circuit shown in FIG. 5A after the learning behavior or by writing it to a digital memory and so on. There may be utilized other known circuit architectures such as the architectures (refer to e.g., Japanese Patent Application Laid-Open Nos. 5-37317 and 10-327054) each schemed to downsize the circuit.

What is exemplified as the learning circuit at the synapse that actualizes the simultaneous arrival of the pulses or the predetermined phase modulation amount, includes the circuit elements as shown in FIG. 5C. To be specific, the learning circuit 402 can be constructed of a pulse propagation time measuring circuit 510 (a propagation time herein indicates a time difference between a time of the pulse output of a presynaptic neuron on a certain layer and an arrival time of this pulse at an output destination neuron existing on a next layer), a time window generation circuit 511, and a pulse phase modulation amount adjusting circuit 512 for adjusting a pulse phase modulation amount in the synaptic portion so that the propagation time takes a fixed value.

The propagation time measuring circuit 510 involves the use of an architecture for inputting clock pulses from the pacemaker neurons configuring the same local receptive field as will be explained later on and obtaining the propagation time based on an output from a counter circuit for these clock pulses in duration of a predetermined time width (time window: see FIG. 3B). Note that the time window is set based on a point of firing time of the output destination neuron, whereby Hebb's learning algorithm (rule) extended as shown below is applied. Process (Extraction of Low-Order Feature by Gabor Wavelet conversion etc) on Feature Detection Layer (1, 0)

Supposing that the feature detection layer (1, 0) contains the neurons detecting a structure (low-order feature) of a pattern having a predetermined spatial frequency in a local area having a certain size and a directional component of being vertical and if there exists a structure corresponding to an interior of the receptive field of N1 on the data input layer 1, the neuron outputs the pulse in phase corresponding to a contrast thereof. This type of function can be actualized by a Gabor filter. A feature detection filter function performed by each of the neurons of the feature detection layer (1, 0) will hereinafter be discussed.

It is assumed that the Gabor wavelet conversion expressed by a filter set having multi-scales and multi-directional components on the feature detection layer (1, 0) and each of the intra-layer neurons (or each group consisting of a plurality of neurons) has a predetermined Gabor filtering function. On the feature detection layer, one single channel is configured by clustering a plurality of neurons groups each consisting of neurons having the receptive field structures corresponding to a convolutional operation kernels of a plurality of Gabor functions that have a fixed scale level (resolution) and different directional selectivities. On this occasion, the neuron group forming the same channel has a different directional selectivity, and the neuron groups exhibiting the same size selectivity may be disposed in positions adjacent to each other, or the neuron groups belonging to different processing channels may also be disposed adjacent to each other. This scheme is based on an idea that the actualization is easier in terms of the circuit architecture by adopting the layouts shown in the respective Figures for the convenience's sake of a connecting process that will be mentioned below in the group-oriented coding.

Incidentally, for details of the method of executing the Gabor wavelet conversion in the neural network, refer to a document (IEEE Trans. On Acoustics, Speed, and Signal Processing, vol. 36, pp. 1169-1179) by Daugman (1988).

Each of the neurons of the feature detection layer (1, 0) has the receptive field structure corresponding to a kernel $g_{mn}$. The kernel $g_{mn}$ having the same scale index m has a receptive field of the same size, and a corresponding kernel $g_{mn}$ size is set corresponding to the scale index in terms of the operation. Herein, the sizes such as 30×30, 15×15 and 7×7 are set on the input image in sequence from the roughest scale. Each neuron outputs the pulse at such an output level (which is herein on a phase basis; an architecture on a frequency basis or an amplitude basis or a pulse basis may also, however, be used) as to become a nonlinear squashing function of a wavelet conversion coefficient value obtained by inputting a sum of products of distribution weighting coefficients and image data. As a result, it follows that the Gabor wavelet conversion is executed as an output of this whole layer (1, 0).

Processes (Extractions of Middle- and High-Order Features) on Feature Detection Layer Unlike the feature detection layer (1, 0), each of the neurons of the subsequent feature detection layers ((1, 1), (1, 2), . . . ) forms, based on the so-called Hebb's learning algorithm etc, the receptive field structure for detecting a feature intrinsic to a pattern of a recognition object. On a more posterior layer, a size of the local area in which to detect the feature becomes stepwise more approximate to a size of the whole recognition object, and geometrically a middle- or high-order feature is detected.

For instance, when detecting and recognizing a face, the middle- (or high-order) feature represents a feature at pattern-element-oriented levels such as eyes, a nose, a mouth etc shaping the face. Between different channels, if at the same hierarchical level (the same level in terms of a complexity of the feature to be detected), a difference of the feature detected comes under the same category but is what is detected by the scales different from each other. For example, the (eye) defined as the middle-order feature is detected as an (eye) having a different size at a different processing channel. Namely, the scheme is that the in-image (eye) having a given size is detected at the plurality of processing channels exhibiting different scale level selectivities.

Note that each of the neurons of the feature detection layer may generally have such a mechanism as to receive, based on the output of the anterior layer, an inhibitory (shunting inhibition) connection in order to stabilize the output (without depending on the extractions of the low- and high-order features).

Process on Feature Integration Layer

The neurons of the feature integration layers ((2, 0), (2, 1), . . . ) will be explained. As illustrated in FIG. 1, the connection to the feature integration layer (e.g., (2, 0)) from the feature detection layer (e.g., (1, 0)) is configured to receive inputs of the excitatory connections from the neurons of the same category (type) of feature elements of the anterior feature detection layer within the receptive fields of the concerned feature integration neurons. The function of the neuron of the integration layer is, as explained above, the local averaging for every feature category, the sub-sampling based on the maximum value detection, and so on.

According to the former mode, the plurality of pulses of the same category of feature are inputted, and then integrated and averaged in the local area (receptive field) (alternatively, a representative value such as a maximum value is calculated within the receptive field), thereby making it possible to surely detect a positional fluctuation and a deformation of the feature. Therefore, the receptive field structure of the neuron of the feature integration layer may be formed so as to become uniform (such as being in a rectangular area having a predetermined size in any cases and exhibiting a uniform distribution of the sensitivity or the weighting coefficient therein) without depending on the feature category.

Pulse Signal Processing on Feature Integration Layer

As discussed above, according to the first embodiment, the feature integration cell is not structured to receive the timing control from the pacemaker neuron on the feature detection layer with a layer number (1, k) anterior thereto. The reason is that in the feature integration cell, the neurons output the pulses in phase (any one of the frequency, the pulse width and the amplitude may be dependent, however, the phase is adopted in the first embodiment) determined not by the arrival time pattern of the input pulse but by, if anything, an input level (such as a temporal summation value of the input pulses) within a fixed time range, and hence a time window occurrence timing is not so important. Note that this does not intend to exclude an architecture in which the feature integration cell receives the timing control from the pacemaker neuron on the anterior feature detection layer, and this architecture is, as a matter of course, feasible.

Behavior Principle of Pattern Detection

Next, pulse encoding of a two-dimensional graphic pattern and a detection method thereof will be explained. FIGS. 3A and 3B schematically show how the pulse signals are propagated to the feature detection layer from the feature integration layer (e.g., from the layer (2, 0) to the layer (1, 1) in FIG. 1). The neurons $n_i$ on the side of the feature integration layer correspond to feature amounts (or feature elements) different from each other, while the neurons $n'_j$ on the side of the feature detection layer get involved in detecting a higher-order feature (pattern elements) obtained by combining the respective features within the same receptive field.

An intrinsic delay (intrinsic to the feature) due to a pulse propagation time and a time delay etc in the synaptic connection ($S_{j,i}$) to the neuron $n'_j$ from the neuron $n_i$, occurs in each inter-neuron connection. As a result, so far as the pulses are outputted from the neurons of the feature integration layer, pulses of a pulse train Pi are set to arrive at the neuron $n'_j$ in a predetermined sequence (such as $P_4$, $P_3$, $P_2$, $P_1$ in FIG. 3A), depending on a delay amount at the synaptic connection that is determined by learning.

Figure 3B:
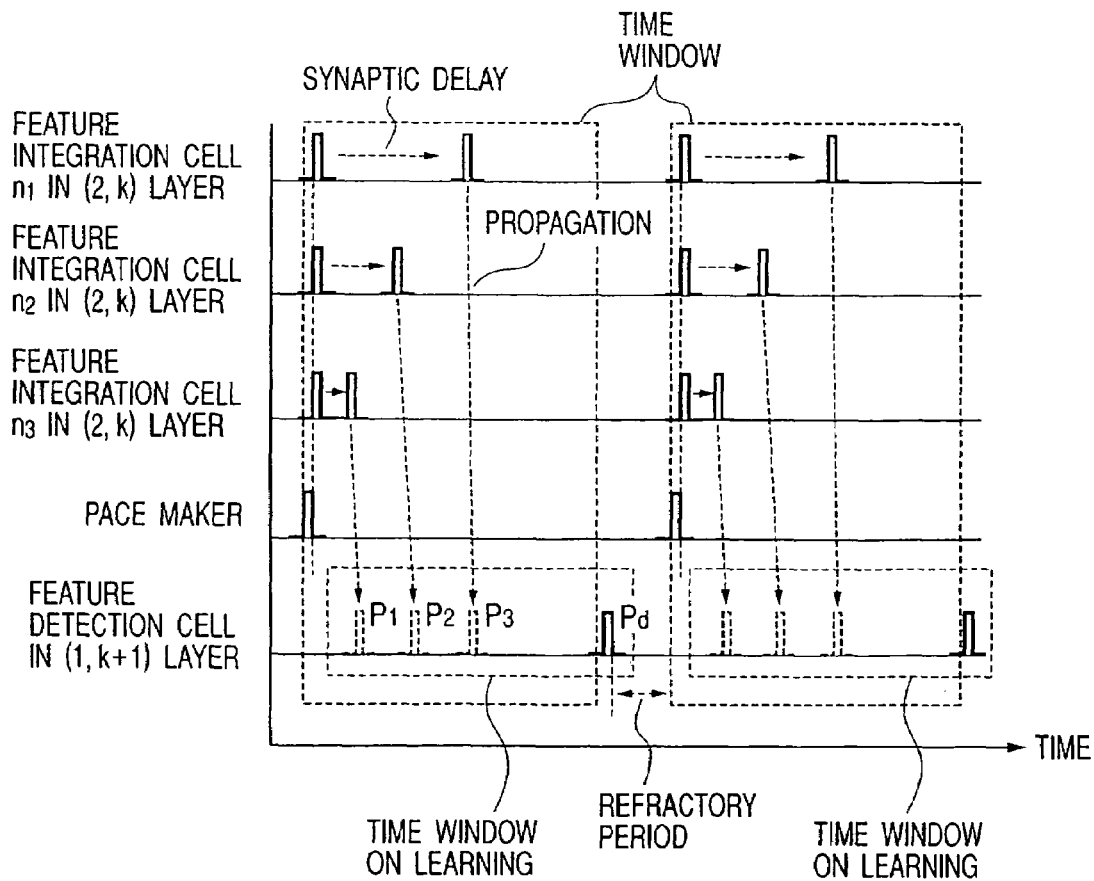

FIG. 3B shows a pulse propagation timing to a certain feature detection cells ($n'_j$) (detecting a higher-order feature) in a layer having a layer number (1, k+1) from feature integration cells $n_1$, $n_2$, $n_3$ (individually representing different categories of features) in a layer having a layer number (2, k) in the case of executing the synchronization control of the time window by using the timing signals from the pacemaker neurons that will be mentioned later on.

Figure 6:
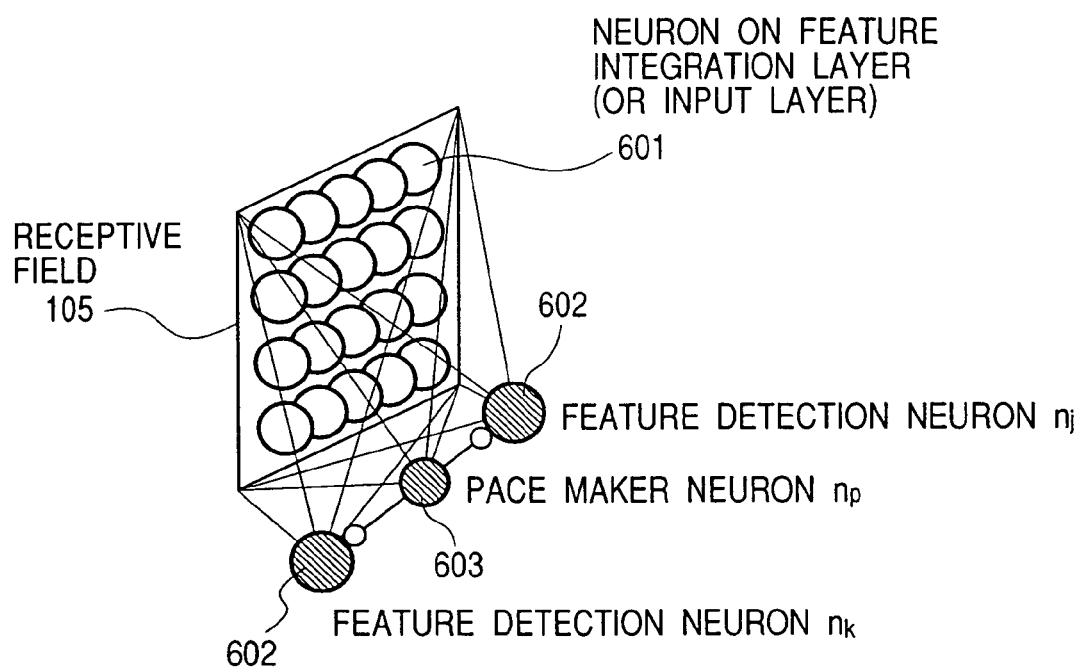
FIG. 6 is a diagram showing a network architecture when inputted to the feature detection layer neuron from a pacemaker neuron.

Referring to FIG. 6, the pacemaker neurons $n_p$ which accompany the feature detection neurons ($n_j$, $n_k$ etc) for detecting different categories of features, form the same receptive field as that of the feature detection neurons and receives the excitatory connection from the feature integration layer (or the input layer). Then, the pulses are outputted to the feature detection neurons and the feature integration neurons at a predetermined timing (or frequency) determined by an input summation value (or an activity level average value of the whole receptive field in order to control so as to depend on a state of representing an action characteristic intrinsic to the whole receptive field).

Further, the scheme in each feature detection neuron is that the time windows are phase-locked to each other with its input serving as a trigger signal but are not phase-locked before receiving the input from the pacemaker neuron as described above, and each neuron outputs the pulse with a random phase. Further, in the feature detection neuron, a time window integration that will be explained below is not performed before receiving the input from the pacemaker neuron but is performed, which is triggered by the pulse input from the pacemaker neuron.

Herein, the time window, which is determined for every feature detection layer neuron ($n'_i$), is common to the respective neurons within the feature integration layer forming the same receptive field with respect to the concerned cell and to the pacemaker neuron, and gives a time range for a time window integration.

The pacemaker neuron existing on the layer having a layer number (1, k) (where k is a natural number) outputs the pulse output to each feature integration cell of the layer having a layer number (2, k−1) and the feature detection cell (the layer number (1, k) to which the pacemaker neuron belongs, whereby the feature detection cell gives a timing signal for generating the time window when adding the inputs in time aspect. A start time of this time window serves as a reference time for measuring an arrival time of the pulse outputted from each feature integration cell. Namely, the pacemaker neuron gives the timing for outputting the pulse from the feature integration cell, and a reference pulse for a time window integration in the feature detection cell.

Each pulse is given a predetermined quantity of phase delay when passing via the synaptic circuit, and arrives at the feature detection cell further via the signal transmission line such as the common bus. A sequence of the pulse train on the time-base at this time is expressed such as pulses ($P_1$, $P_2$, $P_3$) drawn by the dotted lines on the time-base of the feature detection cell.

In the feature detection cell, if larger than the threshold value as a result of the time window integration (normally the integration is effected once; there may also be, however, executed the electric charge accumulation involving the time window integration effected multiple times or the averaging process involving the time window integration effected multiple times) of the respective pulses ($P_1$, $P_2$, $P_3$), a pulse output ($P_d$) is outputted based on a termination time of the time window. Note that the on-learning time window shown in the same Figure is what is referred to when executing the learning algorithm that will hereinafter be discussed.

Spatiotemporal Integration of Pulse Outputs and Network Characteristic

Next, an arithmetic process of spatiotemporal weighting summation (a load summation) of the input pulses will be explained. As shown in FIG. 7B, each neuron takes a weight summation of the input pulses by use of a predetermined weighting function (e.g., Gaussian function) for every sub time window (timeslot), and the summation of weights is compared with a threshold value. The symbol $\tau_j$ represents a central or peak position of the weighting function of a sub time window j, and is expressed by a start time reference (an elapse time since the start time) of the time window. The weighting function is generally a function of a distance (a deviation on the time-base) from a predetermined central position (representing a pulse arrival time in the case of detecting a detection target feature), and assumes a symmetry. Accordingly, supposing that the central position $\tau$ of the weighting function of each sub time window (timeslot) of the neuron corresponds to a time delay after learning between the neurons, a neural network for obtaining the spatiotemporal weighting summation (the weight summation) of the input pulses can be defined as one category of a radial basis function network (which will hereinafter be abbreviated to RBF) in the time-base domain. A time window $F_{Ti}$ of the neuron ni using Gaussian function as a weighting function is given by:

$$F_{Ti} = \sum_j^N b_{ij}\delta(t-\tau_{ij})\exp\left(-\frac{(t-\tau_{ij})^2}{\sigma_{ij}^2}\right) \quad (1)$$

where $\sigma$ is a spread with respect to every sub time window, and $b_{ij}$ is a coefficient factor.

Note that the weighting function may take a negative value. For example, if a certain feature detection layer neuron is to detect eventually a triangle and when detecting a feature ($F_{faulse}$) that is not apparently an element configuring this graphic pattern, a connection from the feature detection (integration) cell and a weighting function making a negative contribution can be given from pulses corresponding to the concerned feature ($F_{faulse}$) in the summation value calculation process of the input so that the detection of the triangle is not eventually outputted even if there is a large contribution from other feature elements.

A spatiotemporal summation $X_i(t)$ of the input signals to the neurons $n_i$ of the feature detection layer is given by:

$$X_i(t) = \sum_j S_{ij}F_{Ti}(t)Y_j(t-\tau_{ij}-\varepsilon_j) \quad (2)$$

where $\varepsilon_j$ is an initial phase of the output pulse from the neuron $n_j$. If converged at 0 due to synchronization firing with the neuron $n_i$, or if the phase of the time window is forcibly synchronized with 0 due to the timing pulse input from the pacemaker neuron, $\varepsilon_j$ may be set to 0 at all times. When obtaining the weight summation on the basis of the pulse input in FIG. 7A and the weighting function shown in FIG. 7B, a time-varying transition of the weight summation value as shown in FIG. 7E is obtained. The feature detection layer neuron outputs the pulse when this weight summation value reaches a threshold value (Vt).

The output pulse signal from the neuron $n_i$ is, as explained above, outputted to the neuron of the high-order layer with a time delay (phase) given by learning at such an output level as to become a squashing nonlinear function of the spatiotemporal summation (a so-called input summation) of the input signals (wherein the pulse output takes a fixed frequency (binary) and is outputted in a way that adds a phase modulation quantity serving as the squashing nonlinear function with respect to the spatiotemporal summation of the input signals to a phase corresponding to a fixed delay amount determined by learning).

Learning Algorithm

The learning circuit 402 may be structured so that the time window described above comes to have a narrower width as the frequency at which an object having the same category is presented becomes larger. With this contrivance, the learning circuit 402 behaves so as to get close to a coincidence detection mode for detecting simultaneous arrivals of the plurality of pulses as the pattern category is more familiar (which means a larger presentation count and a larger learning count). This scheme makes it possible to reduce the time required for detecting the feature (to perform an instantaneous detection behavior) but is unsuited to a fine comparative analysis of the spatial layout of the feature elements and to a distinction between the similar patterns and so forth.

In the learning process of the delay amount, for example, by extending to a complex number domain, a complex connection weight $C_{ij}$ between the feature detection layer neuron ni and the feature integration layer neuron $n_j$ is given such as:

$$C_{ij} = S_{ij}\exp(iP_{ij}) \quad (3)$$

where the first i in the function exp represents an imaginary number unit, $S_{ij}$ denotes a connection strength, and $P_{ij}$ indicates a phase. The phase $P_{ij}$ is a phase corresponding to the time delay of the pulse signal outputted to the neuron i from the neuron j at a predetermined frequency. The connection strength $S_{ij}$ reflects the receptive field structure of the neuron i, and has a structure that generally differs corresponding to a recognition/detection object. This is separately formed by learning (supervised learning or self-organization), or is formed as a predetermined structure.

On the other hand, the learning algorithm for the self-organization relative to the delay amount is given by:

$$\dot{C}_{ij} = \beta S_{ij}\exp\{-i2\pi\tau_{ij}\} - C_{ij} \quad (4)$$

where $\dot{C}$ is a time differential of C, $\tau_{ij}$ is the time delay (a preset quantity) described above, and $\beta$ (through 1) indicates a constant. When solving the above equation, $C_{ij}$ converges at $\beta\exp(-2\pi i\tau_{ij})$, and hence $P_{ij}$ converges at $-\tau_{ij}$. Explaining an example of applying the learning algorithm with reference to the on-learning time window shown in FIG. 3B, only when both of presynaptic neurons (n1, n2, n3) and postsynaptic neurons (feature detection cells) fire in a time range of the learning time window, is the connection weight updated based on the formula (4). Note that the feature detection cells fire after an elapse of the time window in FIG. 3B and may also fire before the elapse of the time window in FIG. 3B.

Process on Feature Detection Layer

Processes (for learning and recognition) executed mainly on the feature detection layer will hereinafter be described. Each feature detection layer inputs the pulse signals with respect to a plurality of different features from the same receptive field within the processing channel set at every scale level as explained above, and calculates the spatiotemporal weighting summation (the weight summation) and implements a threshold process. The pulse corresponding to each feature amount arrives at a predetermined time interval, depending on a delay amount (phase) predetermined by learning.

Learning control of this pulse arrival time patter is not essential to the first embodiment and is not therefore explained in depth. For instance, however, to be brief, the pulse corresponding to the feature element among the plurality of future elements configuring a certain graphic patter, if most contributory to detecting this pattern, arrives earlier, and, between the feature elements showing, if intact, substantially the same pulse arrival time, there is introduced a competitive learning scheme that the pulses arrive away by a fixed quantity in time from each other. Alternatively, there may be taken such a scheme that the pulses arrive at time intervals different between predetermined feature elements (configuring a recognition object and conceived important in particular such as a feature exhibiting a large mean curvature, a feature exhibiting a high rectilinearity and so forth).

According to the first embodiment, each of the neurons corresponding to the respective low-order feature elements within the same receptive field on a certain feature integration layer defined as a anterior layer, synchronously fires (pulse output) in a predetermined phase. Generally, there exist the connections to the feature detection neurons, defined as the neurons of the feature integration layer, for detecting, though different in their positions, the same high-order feature (in this case, there are the connections, configuring, though difference in their receptive fields, the same high-order feature). At this time, as a matter of course, the synchronous firing occurs also among these feature detection neurons. The output level thereof (a phase basis is herein taken; an architecture taking a frequency basis or an amplitude basis or a pulse width basis may also, however, be adopted) is, however, determined by a summation (or average, etc.) of contributions from the plurality of pacemaker neurons that are each given for every receptive field of the feature detection neuron. In the interior of the time window, the weighting function has such a profile that the peak value corresponds to a synaptic weight value. Further, a means for actualizing the weighting addition within the time window taking the peak value is not limited to the neuron element circuit shown in FIGS. 2A, 2B and 2C and may be, as a matter of course, actualized otherwise.

This time window corresponds more or less to a time zone excluding the refractory period of the neuron. Namely, there is no output from the neuron even by receiving whatever input during the refractory period (a time range other than the time window), however, the behavior that the neuron fires corresponding to the input level in the time window excluding the time range, is similar to that of the actual biological neuron. The refractory period shown in FIG. 3B is a time zone from immediate after the firing of the feature detection cell to a start time of the next time window. A length of the refractory period and a width of the time window can be, of course, arbitrarily set, and the refractory period may not be set shorter than the time window as shown in FIG. 3B.

According to the first embodiment, as schematically shown in FIG. 6, the already-explained mechanism is that the start timing described above is made common by means of inputting the timing information (clock pulse) by the pacemaker neuron (pulse output at a fixed frequency) receiving the inputs from the same receptive field with respect to, for example, every feature detection layer neuron.

If configured in this fashion, the synchronization control (even if necessary) of the time window does not need effecting throughout the network, and, even when the clock pulse fluctuates as described above, the reliability of detecting the feature is not degraded because of receiving uniformly an influence of the output from the same local receptive field (the on-the-time-base positional fluctuation of the window function becomes the same among the neurons forming the same receptive field). A tolerance of scatter in circuit element parameter also increases in order for the local circuit control to enable the synchronization behavior with a reliability to be attained.

For simplicity, the feature detection neuron for detecting the triangle as a feature will be described. It is assumed that the feature integration layer anterior thereto reacts to a graphical feature (feature elements) such as L-shaped patterns ($f_{11}$, $f_{12}$, . . . ) having multiple directions, combinational patterns ($f_{21}$, $f_{22}$, . . . ) of line segments each having a continuity (connectivity) to the L-shaped pattern and combinations ($f_{31}$, . . . ) of a part of two sides configuring the triangle as depicted in FIG. 7C.

Figure 7C:
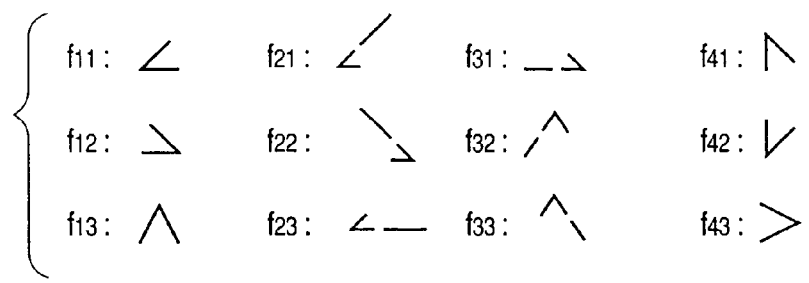

Further, $f_{41}$, $f_{42}$, $f_{43}$ shown in FIG. 7C represent features shaping the triangles having different directions and corresponding to $f_{11}$, $f_{12}$, $f_{13}$. The intrinsic delay amount is set between the neurons forming the inter-layer connection by learning, and, as a result of this, in the triangle feature detection neuron, the pulses corresponding the principal and different features shaping the triangle are set beforehand to arrive at respective sub time windows (timeslots) ($w_1$, $w_2$, . . . ) into which the time window is divided.

For instance, the pulses corresponding to combinations of the feature sets each shaping the triangle on the whole as shown in FIG. 7A, arrive first at the sub time windows $w_1$, $w_2$, . . . , $w_n$ into which the time window is divided by "n". Herein, the delay quantities are set by learning so that the L-shaped patterns ($f_{11}$, $f_{12}$, $f_{13}$) arrive at within $w_1$, $w_2$, $w_3$, respectively, and the pulses corresponding to the feature elements ($f_{11}$, $f_{12}$, $f_{13}$) arrive at within $w_1$, $w_2$, $w_3$, respectively.

The pulses corresponding to the feature elements ($f_{31}$, $f_{32}$, $f_{33}$) arrive in the same sequence. In the case shown in FIG. 7A, the pulse corresponding to one feature element arrive at the single sub time window (timeslot). The division into the sub time windows has such a significance that an integration mode when integrating those features, e.g., a processing mode such as setting a condition that all the feature elements be detected or a condition that a given proportion of features be detected and so on, is to be enhanced in its changeability and adaptability by individually surely detecting the pulses (detection of the feature elements) corresponding to the different feature elements developed and expressed on the time-base in the restive sub time windows.

For instance, under conditions where the recognition (detection) object is a face and a search (detection) for an eye defined as one of parts configuring the face is important (a case where the priority of detecting the eye's pattern is set high in the visual search), a reaction selectivity ((a detection sensitivity to a specified feature) corresponding to a feature element patter selectively configuring the eye can be enhanced by introducing a feedback connection from a high-order feature detection layer. This scheme makes it possible to detect the feature in a way that gives a higher importance to a lower-order feature element shaping a high-order feature element (pattern).

Further, assuming that the pulse corresponding to a more importance feature is set previously to arrive at the earlier sub time window, the feature exhibiting the higher importance is easier to detect by setting a weighting function value in the concerned sub time window larger than values in other sub time windows. This importance (the detection priority among the features) is acquired by learning or may also be predefined.

Accordingly, if on condition that there occurs an event such as detecting a given proportion of feature elements, the division into the sub time windows comes to have almost no meaning, and the processing may be implemented in one single time window.

Figure 7D:
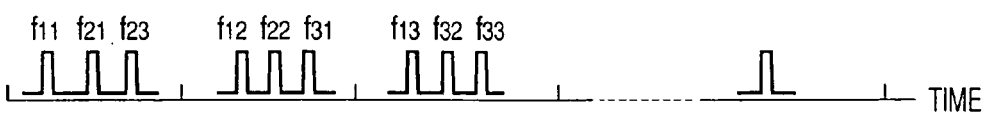
Figure 7E:
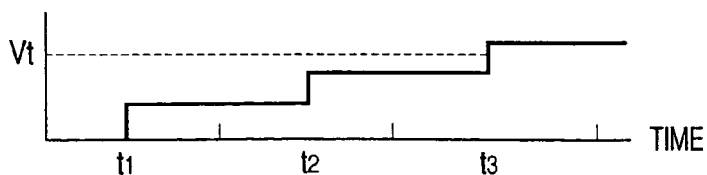

Note that the pulses corresponding to the plurality (three) of different feature elements arrive respectively and may also be added (FIG. 7D). Namely, it may be based on a premise that the pulses corresponding to the plurality of feature elements (FIG. 7D) or an arbitrary number of feature elements, be inputted to one single sub time window (timeslot). In this case, referring to FIG. 7D, the pulses corresponding to other feature elements $f_{21}$, $f_{23}$ supporting the detection of an apex angle portion $f_{11}$ of the triangle, arrive at the first sub time window. Similarly, the pulses corresponding to other feature elements $f_{22}$, $f_{31}$ supporting the detection of an apex angle portion $f_{12}$ arrive at the second sub time window.

Note that the number of divisions into the sub time windows (timeslots), the width of each sub time window (timeslot), the feature class, and the allocation of the time intervals of the pulses corresponding to the feature elements, are not limited to those described above and can be, as a matter of course, changed.

Second Embodiment

Figure 11B:
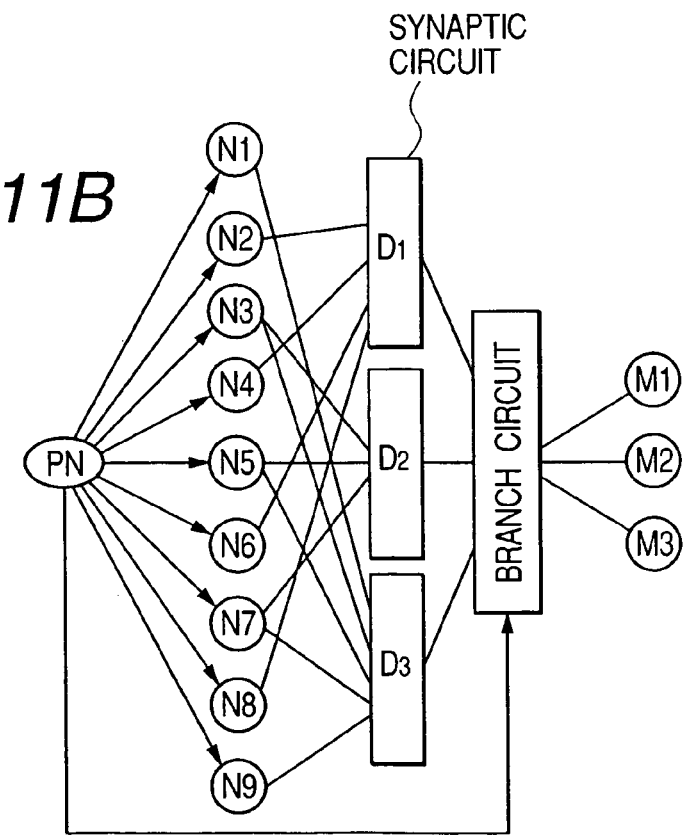

According to a second embodiment, as shown in FIG. 11B, a branch circuit for outputting in branch the outputs from the synaptic circuits is set as a characteristic component by use of a local timing generation element (or pacemaker neuron) PN as shown in FIG. 11B. The branch circuit has a demultiplexerwise function as will be exemplified in an embodiment that follow. The branch circuit outputs the output from each of the synaptic circuits to each of the different feature detection layer neurons in accordance with the timing signal transmitted from the local timing generation element. This scheme enables farther wires from the synaptic circuits to be more simplified than in the architecture in the embodiment 1.

For instance, supposing that the timing generation element generates a low-frequency pulse signal having a smaller pulse width than a period of the pulse train, the branch circuit is structured to output, to the feature integration layer neuron intrinsic to the timeslot, the pulse signal from the synaptic circuit that is inputted to within each of the timeslots obtained by equally dividing a time width up to a next pulse rise from a fiducial time corresponding to a rise time of each pulse signal by the number of output destination neurons. For attaining this, the branch circuit may suffice on condition that it has a switch element for establishing a connection to a line different for, e.g., every timeslot and functions as a demultiplexer (refer to a third embodiment). Note that the process of the neuron receiving the signal having undergone the modulation in the synaptic circuit, is the same as in the embodiment 1.

Third Embodiment

A third embodiment involves the use of a circuit, as a synaptic circuit, incorporating a demultiplexer function together that sets variable a modulation amount at the delay element of the synaptic circuit, controls the modulation (delay) amount of the pulse signal on the basis of the timing signal from the local timing element and branches by switching the output pulses. With this architecture adopted, by contrast with the architecture in the embodiment discussed above in which the synaptic circuit giving the different delay amount is formed independently as the circuit that is at least physically different, even such a synaptic circuit is shared in a time-sharing manner, thereby scheming to further downsize the circuit scale. Note that the process of the neuron receiving the signal having undergone the modulation in the synaptic circuit is the same as in the embodiment 1.

Figure 12:
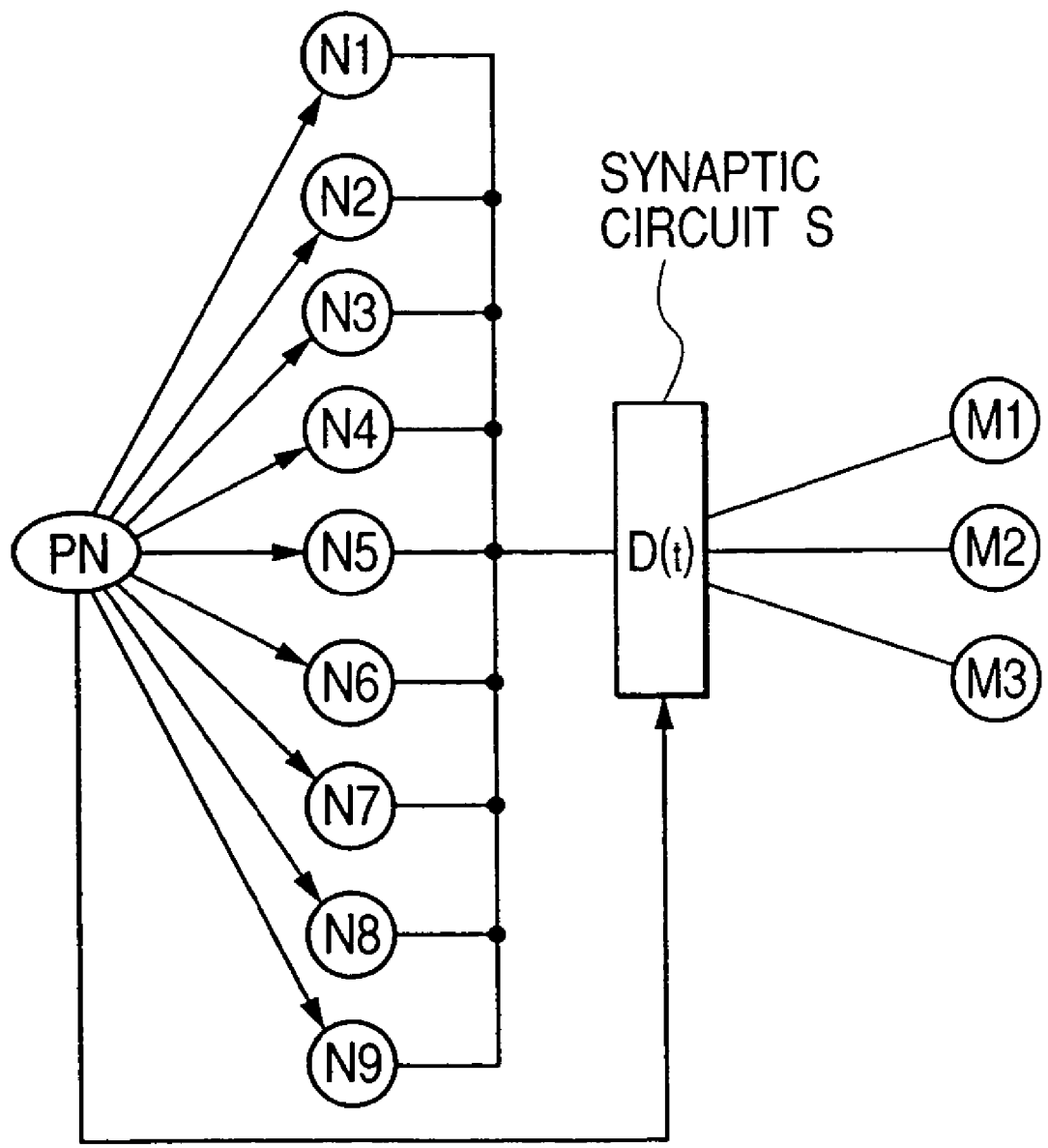
FIG. 12 is a diagram showing a further sharing structure of the synaptic connection circuit.

As shown in FIG. 12, a synaptic circuit S as a simplified version of the circuit architecture in FIG. 11B provides branch output destinations of the signals after being modulated and modulation amounts (delay amounts) each different for every timeslot (see FIG. 8) obtaining by effecting time-sharing of a period up to a next timing pulse on the basis of the fiducial time corresponding to a rise time of the timing pulse from the local timing element.

Figure 13:
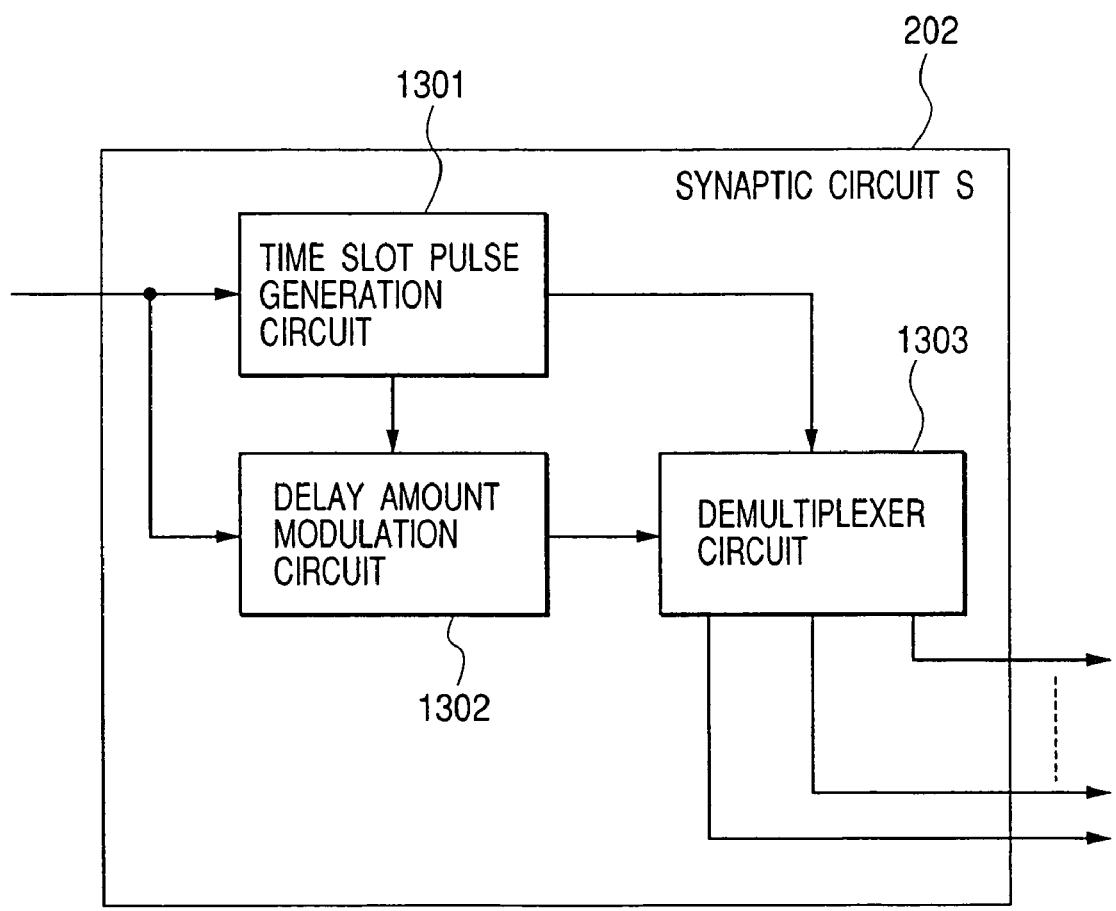
FIG. 13 is a diagram showing a detailed architecture of the synaptic connection circuit.

The synaptic circuit is structured to include, as shown in FIG. 13, a timeslot pulse generation circuit 1301, a delay amount modulation circuit 1302, and a demultiplexer circuit 1303 constructed of a switch array, an activation circuit etc.

The demultiplexer circuit 1303 has a characteristic function of outputting, with a master clock pulse timing serving as a fiducial time, inputted data pulse signals to different branch lines in a predetermined sequence when a switch intrinsic to each of timeslots ($T_1, T_2, \ldots, T_n$) is switched ON.

FIG. 14 is a timing chart schematically showing an example of behaviors of the respective elements of the synaptic circuit S when the demultiplexer circuit 1303 includes four sets of switch arrays and four lengths of output lines. Referring to FIG. 14, respective delay amounts ($D_1, D_2, D_3$) correspond to the modulation amounts in the respective synaptic circuits in the preceding embodiment, and the pulse signal after being modulated is outputted to the branch line as an output destination when each switch comes to the ON-state.

The timeslot pulse generation circuit 1301, after inputting the reference timing pulse from the local timing element described above, generates the pulse signals at an interval of a predetermined time that is shorter than a master cock interval in a way that synchronizes the reference timing pulse as a master clock (refer to the output of the timeslot pulse generation element in FIG. 14), wherein a time width between the respective pulses corresponds to the timeslot.

The delay amount modulation circuit 1302 includes a selector for inputting the master clock from the local timing element described above and selecting, based on the master clock, one of a plurality of delay times preset in the input timing sequence of the pulse signals from the timeslot pulse generation element. Namely, each of the time-varying delay amounts has a certain magnitude quantized as shown in FIG. 8, and the delay amount modulation circuit 1302 time-controls the delay amount by selecting one of the plurality of preset fixed delay circuits for every timeslot. Then, the demultiplexer circuit 1303 branch-outputs the pulse signals each having undergone the delay modulation for every timeslot to the neurons different from each other. Note that the delay amount may be, as a matter of course, time-controlled by methods other than the above-mentioned.

According to the embodiments discussed above, the pulse signal processing circuit includes the modulation circuit for inputting the plurality of pulsed signals from the different arithmetic elements and modulating in common the predetermined signals among the plurality of pulse signals, and the modulated pulse signals are outputted in branch to the different signal lines. This architecture yields such an effect that the modulation circuit, which should provide the predetermined modulation amount to the plurality of pulsed signals, is not required to be set for every pulse (every input-side signal line) in the signal processing system for transmitting the pulsed signals between the plurality of arithmetic elements in a way that executes the predetermined modulation on the pulsed signals, and the circuit scale can be downsized.

Further, in the parallel processing circuit including the plurality of neuron elements and the synaptic connection elements for connecting the neuron elements, the synaptic connection element is constructed by use of the pulse signal processing circuit, whereby the parallel signal processing circuit using the pulse signals can be simplified.

Moreover, in the pattern recognition system including the data input unit of a predetermined dimension, the plurality of data processing modules and the data output unit for outputting the result of the pattern recognition, the data processing module has the feature detection layer for detecting the plurality of features and is constructed of the plurality of arithmetic elements connected to each other by the predetermined synaptic connection unit, the arithmetic elements within the data processing module output the pulsed signals at the frequency or timing corresponding to the arrival time pattern of the plurality of pulses within the predetermined time window, the output unit outputs the result of detection or recognition of the predetermined pattern on the basis of the outputs from the respective arithmetic elements on the processing layer, the synaptic connection unit includes the modulation circuit for inputting the plurality of pulsed signals from the different arithmetic elements and modulating in common the predetermined signals among the respective pulses, the synaptic connection unit outputting in branch the respective modulated pulsed signals to the different signal lines, and the circuit scale can be thereby downsized and simplified in the hierarchical signal processing system for extracting the feature on the basis of the spatiotemporal distribution of the pulsed signals.

Further, the parallel processing circuit has the structure in which the plurality of synaptic connections are shared as one single circuit on the basis of the distribution symmetry of the synaptic connection to the predetermined neuron elements, thereby attaining the reduction in the circuit scale in accordance with the degree of symmetry of the synaptic connection distribution.

Further, the modulation circuit is structured as the delay circuit for giving the predetermined delay to the pulse signal, whereby the individual synaptic connection weight can be actualized by the common pulse signal delay circuit.

Still further, the pulse signal processing circuit includes the modulation circuit for inputting the plurality of pulsed signals from the different arithmetic elements and effecting the predetermined modulation on each pulse, and the branch circuit for outputting in branch the modulated pulsed signals to the different signal lines in the predetermined sequence in a way that gives the predetermined delay to the pulsed signal. With this architecture, the pulsed signals having undergone the common modulation can arrive at the plurality of arithmetic elements (neurons) existing at the spatially different pulse propagation distance from a certain arithmetic element (neuron) at the same timing or the timing based on the predetermined rule.

Fourth Embodiment

According to a fourth embodiment, in the convolutional network architecture already explained above, a synaptic circuit block implements a parallel pulse signal process including the time window integration with respect to the output pulsed signals from the respective feature integration layer neurons. According to the embodiments discussed so far, the time window integration is performed on the side of the neuron. By contrast, however, the time window integration is executed in parallel on the side of the synapse according to the fourth embodiment.

Figure 15A:
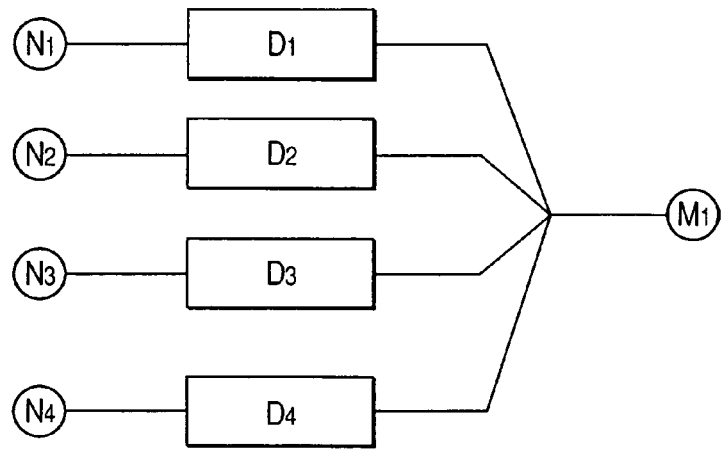
FIGS. 15A and 15B are diagrams schematically showing a basic architecture of the network in an embodiment 4.

An architecture in FIG. 15A is that synaptic circuit blocks ($D_1, \ldots, D_4$) output the signals defined as results of implementing the time window integration using the weighting coefficient mapped to the synaptic weight value with respect to the output pulses from the integration layer neurons ($N_1, \ldots, N_4$), and the feature detection layer neuron ($M_1$) adds the signals after being integrated, thereby forming an internal state of the neuron.

Figure 15B:
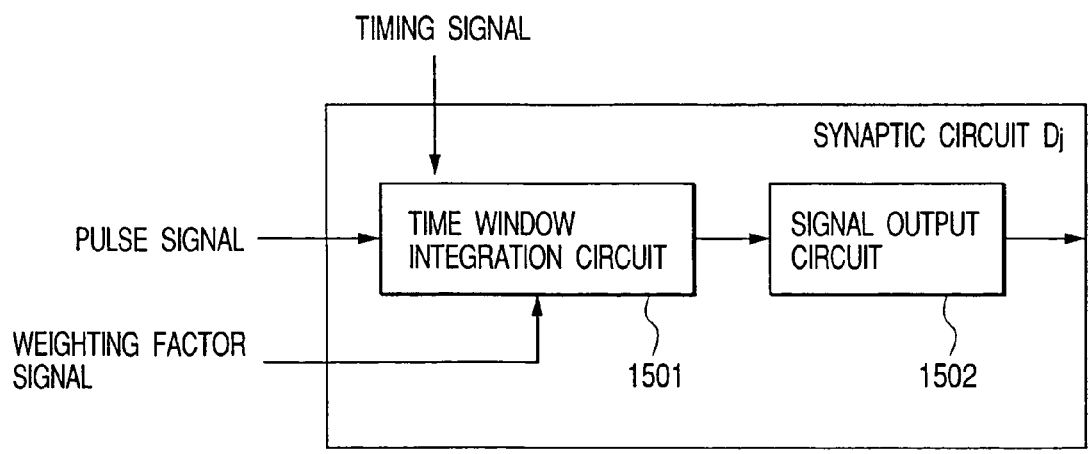

FIG. 15B shows a configuration of each of the synaptic circuits $D_j$. The synaptic circuit $D_j$ is structured to input a pulse signal from the anterior hierarchy, a weighting coefficient function signal and a timing signal for taking synchronization between the layers. A time window integration circuit 1501 executes the time window integration of an input pulse signal and a weighting coefficient function. An output signal generation circuit 1502 generates and outputs a signal corresponding to a result of the time window integration. Note that the output signal generation circuit 1502 may output directly the result of the time window integration.

A weighting coefficient value of the weighted time window integration carried out in each of the synaptic circuits is given as a function of time as in the first embodiment. What is characteristic of the fourth embodiment is, however, that a peak value thereof corresponds to $S_{ij}$ in the formula (4) in the embodiment 1. Note that a profile of the weighting coefficient function of the time window integration may be, as a matter of course, set in the way described above.

The peak value of this weighting coefficient function is defined as a synaptic connection weight value configuring the receptive field structure needed for detecting that a local feature (which is, e.g., a local feature as shown in FIG. 7C when the feature detection layer neuron detects a triangle) at a predetermined low-order level has a proper spatial geometrical relationship so as to shape the feature detected by the feature detection layer neuron.

The weighting coefficient function can be set corresponding to any of a case where the output from the feature integration layer neuron is a phase modulation pulse and a case where the same output is a pulse width modulation signal. In the former case, however, a profile of distribution of this value is, unlike the profile shown in FIG. 7B, asymmetrical within each sub time window. In the latter case, the weighting coefficient function takes a fixed value corresponding to the synaptic connection weight value without depending on the time.

For example, in the case of inputting the phase modulation pulse signal, the weighting coefficient function linearly decreases corresponding to a delay time from an arrival predetermined time if a detection level for detecting the local feature concerned comes to its maximum. In the case of the pulse phase modulation signal, there is multiplied the weighting coefficient value of a level corresponding to a phase delay (which is a delay from the reference time, given by the timing signal, of the pulse arrival time) corresponding to a magnitude of the output of the feature integration layer neuron. For instance, a substantial product-sum operation of the synaptic weight value and the neuron output is performed by decreasing the weighting coefficient value linearly corresponding to the delay of the pulse signal arrival time.

Further, when the pulse width modulation signal corresponding to the neuron output is inputted to the synaptic circuit, a profile of the weighting coefficient function may be set so that a result of time integration of the time-varying weighting coefficient function and the pulse width modulation signal is mapped to a result of multiplication of the integration layer neuron output and the synaptic connection weight value.

When executing the time window integration, normally the feature detection layer neuron, the feature integration layer neuron existing within the receptive field thereof and the synaptic circuit, input and output the pulse signals in synchronization with the predetermined timing signals. This timing signal may involve the use of the signal from the pacemaker neuron as in the first embodiment, or the clock signal supplied from outside.

A waveform of the weighting coefficient signal may be supplied from outside by a function waveform generator, or alternatively a digital circuit generates a digital waveform by a LUT (Look-Up Table) method and a function generation method, and thereafter the digital waveform is converted by a D/A converter into an analog waveform (Morie, et al., "Study and Research for AD Merged System Image Feature Extraction LSI and Natural Image Recognition System Using the Same LSI": Study of Specified Field in 2000, Mixed Integrated Systems for Real-Time Intelligent Processing, pp. 41-47) Note that it is easy to generate a high-precision voltage waveform as a function of time.

As in the fourth embodiment, the product with the synaptic weight can be calculated by the time window integration with respect to the pulse modulation output signal from the neuron, whereby the high-precision product-sum operation can be actualized with the compact circuit architecture.

Figure 16:
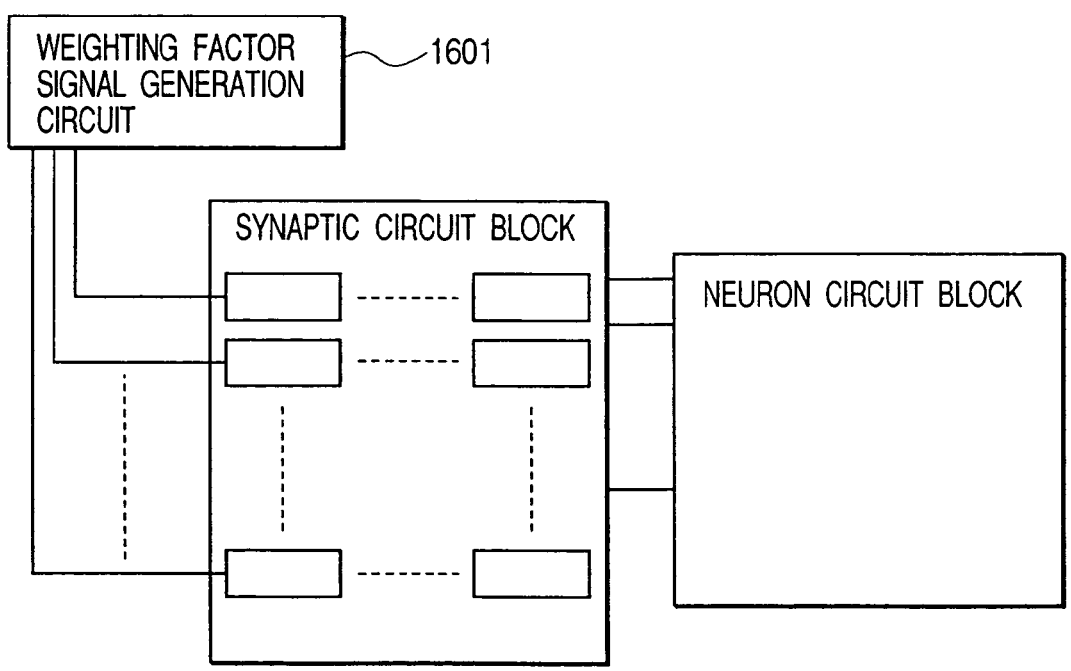
FIG. 16 is a diagram schematically showing how weighting coefficient signals are distributed to the respective synaptic circuits from a weighting coefficient generation circuit.

A weighting coefficient signal generation circuit 1601 distributes, as shown in FIG. 16, an arbitrary analog non-linear function (function of time) supplied from outside or generated with a high precision within the chip as a weighting coefficient signal to each synaptic connection circuit in the synaptic circuit block to the feature detection layer neurons related to the same feature class.

After undergoing the time window integration in the synaptic circuit block, the respective signals (pulse signals) to be outputted are outputted in branch to the predetermined neuron circuits inside the neuron circuit block, wherein a summation is taken. Referring again to FIG. 16, each of the synaptic circuits arrayed line by line within the synaptic circuit block supplies this weighting coefficient signal to every synaptic connection circuit to the feature detection layer neuron, whereby an arbitrary synaptic connection weight distribution within one receptive field can be generated as a spatiotemporal function.

Figure 17:
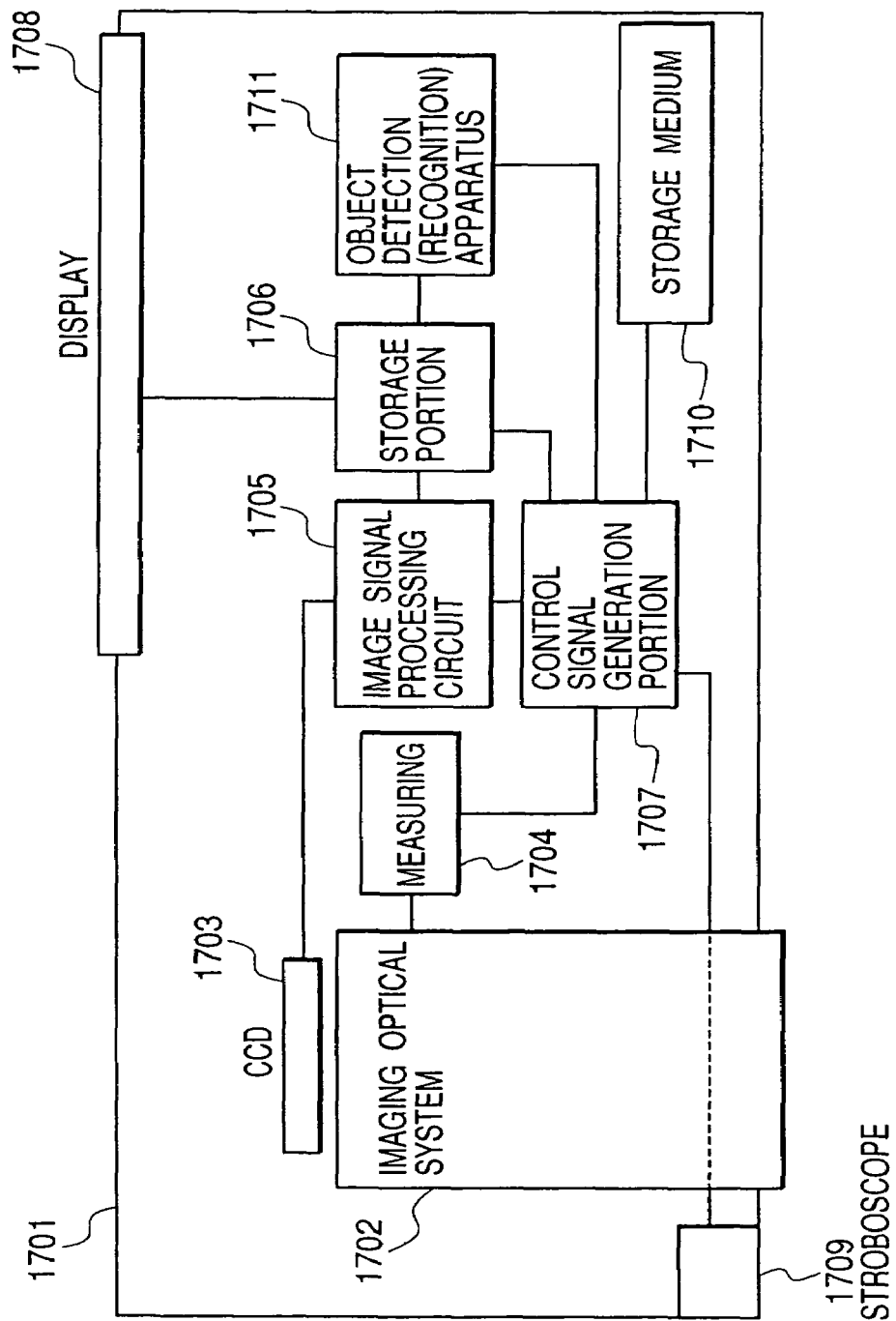
FIG. 17 is a diagram schematically showing an architecture of an image input system mounted with an object recognition system using a parallel pulse signal processing circuit in the embodiment 4.

FIG. 17 illustrates an outline of an architecture of an image input system (for instance, a camera, a video camera, a scanner and so on) mounted with the pattern recognition system as an object detection (recognition) system, which is based on the parallel pulse signal process involving the elements in the architecture shown in FIGS. 15A and 15B as basic elements.

Referring to FIG. 17, a photographic system 1701 includes an imaging optical system 1702 containing a photographic lens and a drive control mechanism for zoom photography, a CCD or CMOS image sensor 1703, an imaging parameter measuring portion 1704, an image signal processing circuit 1705, a storage portion 1706, a control signal generation portion 1707 for generating control signals for control of imaging conditions, a display 1708 serving as a viewfinder such as EVF etc, a stroboscope light emitting portion 1709 and a storage medium 1710. Further, the photographic system 1701 further includes an object detection (recognition) system 1711 (the pattern recognition system constructed of the parallel pulse signal processing circuit having the hierarchical structure in the embodiments discussed above).

This object detection (recognition) system 1711 in this photographic system 1701 detects (an existing position and a size of), for example, a face image of a pre-registered figure from within a picture photographed. When the position of this figure and a piece of size data are inputted to the control signal generation portion 1707, the control signal generation portion 1707 generates, based on an output from the imaging parameter measuring portion 1704, control signals for optimally controlling a focus on this figure, exposure conditions, a white balance and so on.

The pattern detection (recognition) system according to the present invention is thus utilized for the photographic system, as a result of which the detection of the figure etc and the optimal photographic control (AF, AE etc) based on this detection can be attained by actualizing the function of surely detecting (recognizing) the object with a low consumption of electricity and at a high speed (in real time).

According to the embodiments discussed so far, the pulse signal processing circuit includes the modulation circuit for inputting the plurality of pulsed signals from the different arithmetic elements and modulating in common the predetermined signals among the plurality of pulsed signals, and the modulated pulse signals are outputted in branch to the different signal lines, wherein the modulation circuit, which should provide the predetermined modulation amount to the plurality of pulsed signals, is not required to be set for every pulse (every input-side signal line) in the signal processing system for transmitting the pulsed signals between the plurality of arithmetic elements in a way that executes the predetermined modulation on the pulsed signals, and the circuit scale can be downsized.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A pulse signal processing circuit comprising:
   (a) a plurality of arithmetic elements for outputting pulse signals;
   (b) a parallel modulation circuit, including a plurality of time window integration circuits, for:
      (i) receiving a plurality of pulse signals from a first set of said arithmetic elements,
      (ii) effecting a predetermined modulation, in parallel, on a plurality of predetermined pulse signals among the received pulse signals,
      (iii) effecting a predetermined weighted time window integration with respect to a plurality of predetermined pulse signals among the modulated pulse signals, and
      (iv) outputting the signals resulting from the time window integration; and
   (c) integration means for (i) integrating the signals output by the parallel modulation circuit and (ii) outputting the integrated signals to a second set of said arithmetic elements.

2. A pulse signal processing circuit according to claim 1, wherein said parallel modulation circuit is a pulse width modulation circuit for effecting a predetermined pulse width modulation on the plurality of predetermined pulse signals among the plurality of pulse signals.

3. A pulse signal processing circuit according to claim 1, wherein outputs of said parallel modulation circuit are outputted in branch to the second set of said arithmetic elements.

4. A pulse signal processing circuit according to claim 1, further comprising a weighting coefficient signal generation circuit, wherein said plurality of time window integration circuits multiplies each of the plurality of predetermined pulse signals among the modulated pulse signals by a weighting coefficient signal transmitted from said weighting coefficient signal generation circuit.

5. An image input system executing a predetermined image input by use of said pulse signal processing circuit of claim 1.

6. A pulse signal processing circuit according to claim 1, wherein said second set of arithmetic elements comprises one of (i) all the arithmetic elements of said first set of arithmetic elements, (ii) some of the arithmetic elements of said first set of arithmetic elements, and (iii) none of the arithmetic elements of said first set of arithmetic elements.

7. A pulse signal processing circuit comprising:
- (a) a timing signal generation circuit for generating and outputting a time signal;
- (b) a plurality of arithmetic elements for (i) outputting pulse signals, (ii) integrating weighted time window integrated pulse signals, and (iii) receiving the time signal; and
- (c) connection means for:
  - (i) connecting said arithmetic elements,
  - (ii) receiving a plurality of pulse signals from a first set of said arithmetic elements,
  - (iii) executing a predetermined weighted time window integration on the received pulse signals, and
  - (iv) outputting the weighted time window integrated pulse signals to a second set of said arithmetic elements, wherein said second set of arithmetic elements integrates the weighted time window integrated pulse signals on the basis of the timing signal.

8. An image input system executing a predetermined image input by use of said pulse signal processing circuit claimed in claim 7.

9. A pulse signal processing circuit according to claim 7, wherein said second set of arithmetic elements comprises one of (i) all the arithmetic elements of said first set of arithmetic elements, (ii) some of the arithmetic elements of said first set of arithmetic elements, and (iii) none of the arithmetic elements of said first set of arithmetic elements.

10. A pulse signal processing circuit comprising:
- a plurality of arithmetic elements for outputting pulse signals; and
- connection means for:
  - (i) connecting said arithmetic elements,
  - (ii) receiving a plurality of pulse signals from a set of said arithmetic elements,
  - (iii) executing a predetermined weighted time window integration on the received pulse signals, and
  - (iv) outputting the weighted time window integrated pulse signals.

* * * * *